United States Patent
Chantalat

(10) Patent No.: US 7,165,581 B2
(45) Date of Patent: *Jan. 23, 2007

(54) METHOD AND APPARATUS FOR PRESERVING BEVERAGES AND FOODSTUFF

(76) Inventor: Vinit Chantalat, 11681 Dawson Dr., Los Altos Hills, CA (US) 94024

( * ) Notice: Subject to any disclaimer, the term of this patent is extended or adjusted under 35 U.S.C. 154(b) by 268 days.

This patent is subject to a terminal disclaimer.

(21) Appl. No.: 10/897,231

(22) Filed: Jul. 21, 2004

(65) Prior Publication Data

US 2006/0016511 A1    Jan. 26, 2006

Related U.S. Application Data

(63) Continuation-in-part of application No. 10/697,061, filed on Oct. 29, 2003, now Pat. No. 6,832,634.

(51) Int. Cl.
    *B65B 1/04*    (2006.01)

(52) U.S. Cl. ...................... 141/64; 141/98; 261/DIG. 7

(58) Field of Classification Search .................. 141/59, 141/63–65, 98, 351; 261/DIG. 7; 22/3, 22/5, 399; 53/510
    See application file for complete search history.

(56) References Cited

U.S. PATENT DOCUMENTS

| | | | | |
|---|---|---|---|---|
| 2,423,358 A | * | 7/1947 | Hohl et al. | 53/432 |
| 2,593,770 A | * | 4/1952 | Kollsman | 261/64.3 |
| 3,486,295 A | * | 12/1969 | Tuma et al. | 53/89 |
| 4,702,396 A | * | 10/1987 | Gwiazda | 222/152 |
| 5,069,020 A | | 12/1991 | Sanfilippo et al. | |
| 5,215,129 A | * | 6/1993 | Berresford et al. | 141/65 |
| 5,396,934 A | * | 3/1995 | Moench | 141/5 |
| 5,566,730 A | | 10/1996 | Liebmann, Jr. | |
| 6,694,709 B1 | * | 2/2004 | Takahashi et al. | 53/510 |
| 6,832,634 B1 | * | 12/2004 | Chantalat | 141/64 |

* cited by examiner

*Primary Examiner*—Steven O. Douglas
(74) *Attorney, Agent, or Firm*—Donald R. Boys; Central Coast Patent Agency, Inc.

(57) ABSTRACT

Systems and methods for preserving a perishable material sensitive to oxygen and bacterial spoilage are taught. The systems in some embodiments comprise a pressurized source of a first gas other than oxygen and a container for the perishable material, the container having a sealable lid, a passage including a one-way valve through the lid connected by a gas conduit to the pressurized source, and a mechanism for venting the container. In various embodiments oxygen exposure to the perishable material in the container is diluted by at least one cycle of pressurizing the container with the first gas other than oxygen, and then venting the container. In some embodiments oxygen dilution is by vacuum.

60 Claims, 18 Drawing Sheets

METHOD AND APPARATUS FOR PRESERVING BEVERAGES AND FOODSTUFF

CROSS REFERENCE TO RELATED DOCUMENTS

The instant application enjoys a priority claim as a continuation in part to U.S. patent application Ser. No. 10/697,061, filed Oct. 29, 2003 now U.S. Pat. No. 6,832,634. The above mentioned application is included herein in its entirety by reference.

FIELD OF THE INVENTION

The present invention relates to food preservation, and more particularly relates to a method and apparatus for dilution and purging of oxygen from within a container, and more particularly to uses of the apparatus for preservation of beverages and foodstuff, which includes pressurization of the container with a gas other than oxygen after dilution in many embodiments.

BACKGROUND OF THE INVENTION

In one aspect of the present invention apparatus and methods for carbonation of liquids are taught; and in another aspect techniques, including apparatus are taught for preserving beverages and foodstuff. It is well-known that carbonated beverages are typically packaged, stored and shipped in plastic or glass bottles sealed with a removable cap or top, most commonly a threaded screw-on cap which can be quickly and easily removed and replaced during use. However, upon removal of the cap, the carbonated liquid within the bottle will begin to lose its carbonation or "fizz". As the beverage is consumed and removed from the bottle, a greater amount of air remains in the bottle relative to the amount of liquid in the bottle. As the air space within the bottle increases relative to the amount of carbonated liquid, even with the cap on the bottle, the carbon dioxide in the liquid will dissipate into the air space above the liquid, and the carbonated liquid will subsequently continue to lose its carbonation or "fizz".

Further to be above, any air existing within a container holding liquid to be carbonated may be entrained in the liquid in the process of carbonation. Another problem encountered when air exists in the bottle container is that for certain natural carbonated beverages, such as fruit juices and beer, is that exposure to air can cause these types of beverages to spoil, go stale or otherwise degrade. Further, when air exists in such a bottle containing a carbonated beverage, further re-carbonation of the beverage may be prevented.

Carbonating devices of prior art have attempted to slow the loss of carbonation in the liquid by increasing the pressure in the bottle. However, regardless of the volume of air compressed into the bottle, the carbonation of the liquid is still eventually lost simply because air still remains in the bottle. Prior art devices have also attempted to enable the user to carbonate or re-carbonate beverages utilizing such as a valved coupling apparatus having a conduit there through which can be screwably-attached to the bottle, or cap-type enclosures for injecting carbon dioxide or other such pressurizing gases into a bottle of wine, wherein the gas is injected through the cork stopper cap in the nature of a hypodermic needle.

However, many beverage carbonation systems and apparatus in conventional art still do not adequately address the problem of air existing within the bottle above the carbonated beverage prior to the carbonation process, and most do not address the problem at all. In such prior art carbonation methods that do attempt to address problem of air in container, it is generally required that the liquid to be carbonated or re-carbonated be contained in a plastic squeezable bottle, such as a P.E.T. bottle as it is known in the art, such that the air in the bottle may be removed by manually opening a valve on the apparatus attached to the bottle, and simultaneously manually depressing the sides of the bottle to permit a substantial amount of the air present in the bottle to be ejected through the valved coupling on the bottle into the atmosphere.

U.S. Pat. No. 5,396,934 issued to Moench on Mar. 14, 1995, discloses a method and apparatus for injecting gas into a bottled fluid to carbonate or maintain carbonation in the liquid, wherein a valve coupling having a conduit extending there through, which is adapted to fixedly attach to the nozzle of a bottle containing liquid. Practice of the Moench invention, however, requires the use of plastic liquid container bottles, such as P.E.T. bottles, which have flexible sides, because in order to purge the container of air, the user must manually depress the sides of the bottle, and simultaneously hold a valve button open on the valved coupling, in order to expel the air.

U.S. Pat. No. 3,986,535 issued to Meckstroth on Oct. 19, 1976, discloses a system and apparatus for the production of sparkling wine by applying carbon dioxide to wine that is already bottled, utilizing a high pressure cap-type enclosure permitting the carbon dioxide to be applied through the cap with an applicator in the nature of a hypodermic needle. The problem of removing any excess air from the space above the liquid within the container, however, is not addressed in the invention.

U.S. Pat. No. 6,036,054 issued to Grill on Mar. 14, 2000, discloses an attachment adapted for a carbonated liquid container which pressurizes the beverage within the container with carbon dioxide or other pressurize gaseous fluid. The attachment is adapted to screwably attach to the nozzle of a bottle container, and provides the user with the ability to vary and control the gas pressure of the container by manipulating a button extending from the attachment. The invention, however, also fails to adequately address the issue of air still remaining in the container prior to the carbonating process.

Such systems and apparatus are often complex, awkward and cumbersome, and further do not enable the user to adequately remove the existing air in bottles other than plastic squeezable bottles, such as from glass bottles containing wine or beer, for example.

What is clearly needed is an improved method and apparatus for carbonating or re-carbonating liquid contained in a bottle, which provides a carbonating apparatus which is of simple design and easily and economically manufactured, utilizing commercially available elements for manufacture. Such an improved method and apparatus simplifies the process of removing the air from within the bottle prior to the application of the pressurizing gas, by eliminating the need to manually squeeze the bottle while simultaneously manually holding opened a valve to eject the air from the bottle. Such an improved method and apparatus is described below in enabling detail.

Further to the above it is known that food and beverage spoilage in many instances is related to oxygenation of the beverage or foodstuff, typically from oxygen in the air. If beverages and food are stored in a container, and there is air in the container (the air containing oxygen) the oxygen may precipitate and accelerate spoilage. The apparatus of the present invention, used in similar ways to the carbonation of liquids, may also serve to retard the spoilage of beverages and foodstuffs. Unique apparatus and methods are taught below for this purpose as well.

SUMMARY OF THE INVENTION

In one embodiment of the invention a system for preserving a perishable material sensitive to oxygen is provided, comprising a pressurized source of a first gas other than oxygen, and a container for the perishable material the container having a sealable lid, a passage including a one-way valve through the lid connected by a gas conduit to the pressurized source, and a mechanism for venting the container. In this system oxygen exposure to the perishable material in the container is diluted by at least one cycle of pressurizing the container with the first gas other than oxygen, and then venting the container.

In one embodiment of the system the one way valve comprises a tire valve stem, and further comprising an air-chuck engaging the tire valve stem holding the one-way valve open. In another embodiment there is in addition a user-operable three-way valve system in the conduit between the air chuck and the pressurized source of first gas, the three-way valve system having a first, a second, and a third orifice providing a first, a second and a third valve state, which in the first state connects the first orifice with the second orifice, in the second state connects the second orifice with the third orifice, and in the third state closes internal passage between all orifices, the valve system connected from the first orifice to the pressurized source of gas other than oxygen and from the second orifice to the gas conduit to the air chuck, with the third orifice open to atmosphere, such that the container may be pressurized, vented and isolated by selecting individual ones of the three positions of the three-way valve.

In some embodiments there is a simple shut-off valve in the gas conduit, and the one-way valve system comprises a stem having an axis and an axial bore through the lid and a cross-bore from the axial bore, the cross-bore exiting the stem at a right angle to the axial bore, the cross-bore covered by a flexible sleeve over the outside diameter of the stem, such that gas introduced through the axial bore flexes the sleeve to enter the container, but gas within the container is prevented by the sleeve from exiting the container. There may also be a releasable adapter having an extension for engaging the coaxial internal passage. In some cases the sealable lid engages the container by a threaded interface, and venting is accomplished by loosening the lid at the threaded interface.

In some embodiments of the system the container comprises a body having substantially spherical top and bottom portions, a threaded neck portion, and a bottom stand, and the container may be blow-molded from a plastic material. One suitable material is polyethylene terephtalate (P.E.T.) material. Also in some embodiments the bottom stand is molded from a plastic material and joined to the body by an adhesive.

In some embodiments, after the one or more dilution cycles, the container is pressurized with a second gas other than oxygen, and the conduit is disengaged, leaving the container pressurized with the second gas. The first gas may be one of, or a mixture of carbon dioxide and nitrogen.

Further, the second gas may be one of, or a mixture of, carbon dioxide, nitrogen, hydrogen, helium, argon, methane, propane or butane.

In another aspect of the invention a system for preserving a perishable material sensitive to oxygen is provided, comprising a pressurized source of a first gas other than oxygen, a container for the perishable material, a separate lid sealable at an upper periphery to the container, and a passage including a one-way valve through the lid, and a pressurizing cover separate from the lid comprising a gasket for sealing to the container at the upper periphery, the pressurizing cover connected by a conduit to the source of pressurized gas other than oxygen. Oxygen exposure to the perishable material in the container is diluted by at least one cycle of engaging the pressurizing cover via the gasket to the upper periphery of the container, and alternately removing the pressurizing cover from the container, allowing the container to vent to atmosphere.

In some embodiments after one or more dilution cycles the sealable lid is sealed to the container. Also in some embodiments, after the sealable lid is sealed to the container, the container is again pressurized through the one-way valve with the first gas other than oxygen. Further in some embodiments, after one or more dilution cycles, the sealed lid is sealed to the container, and the container is again pressurized, by a second gas other than oxygen. The first gas other than oxygen may be one of, or a mixture of carbon dioxide and nitrogen and the second gas may be one of, or a mixture of, carbon dioxide, nitrogen, hydrogen, helium, argon, methane, propane or butane.

In some embodiments the one-way valve through the separate lid comprises a stem having an axis and a coaxial internal passage through the lid, the internal passage exiting the stem at a right angle to the coaxial passage and covered by a flexible sleeve over the outside diameter of the stem, such that gas introduced through the coaxial passage flexes the sleeve to enter the container, but gas within the container is prevented by the sleeve from exiting the container.

Further in some embodiments the container and separate lid are metal, and wherein the seal between the container and lid is a rolled and soldered seal. In some other embodiments the container and separate lid are plastic, and the seal between the container and lid is made by a heat sealing process. Still further in some embodiments the one-way valve is molded of a rubber-like material, and further comprises an engageable/disengageable seal for mounting the one way valve to a hole through the lid.

In another aspect of the invention a method for preserving a perishable material sensitive to oxygen is provided, comprising steps of (a) placing the perishable material in a container having a sealable lid and a passage including a one-way valve through the lid connected by a gas conduit to a pressurized source of a first gas other than oxygen; (b) closing the lid; (c) reducing oxygen in the container by pressurizing the container holding the perishable material with the first gas other than oxygen; and (d) venting the container.

In some embodiments of this method steps (c) and (d) are repeated to further reduce oxygen in the container. Also in some embodiments the one way valve comprises a tire valve stem, and an air-chuck engaging the tire valve stem holding the one-way valve open. In some embodiments there is a user-operable three-way valve system in the conduit between the air chuck and the pressurized source of first gas, the three-way valve system having a first, a second, and a third orifice providing a first, a second and a third valve state, which in the first state connects the first orifice with the second orifice, in the second state connects the second orifice with the third orifice, and in the third state closes internal passage between all orifices, the valve system connected from the first orifice to the pressurized source of gas other than oxygen and from the second orifice to the gas conduit to the air chuck, with the third orifice open to atmosphere, such that the container may be pressurized, vented and isolated by selecting individual ones of the three positions of the three-way valve.

In some other embodiments of the method there is a simple shut-off valve in the gas conduit, and the one-way valve system comprises a stem having an axis and a coaxial internal passage through the lid, the internal passage exiting the stem at a right angle to the coaxial passage and covered by a flexible sleeve over the outside diameter of the stem, such that gas introduced through the coaxial passage flexes the sleeve to enter the container, but gas within the container is prevented by the sleeve from exiting the container. In some other embodiments there is a releasable adapter having an extension for engaging the coaxial internal passage. In some other embodiments the sealable lid engages the container by a threaded interface, and venting is accomplished by loosening the lid at the threaded interface. The container may comprise a body having substantially spherical top and bottom portions, a threaded neck portion, and a bottom stand. In some cases the container except for the bottom stand is blow-molded from a plastic material. The plastic material may be polyethylene terephtalate (P.E.T.) material, and the bottom stand may be molded from a plastic material and joined to the body by an adhesive.

In some embodiments of the method, after the one or more dilution cycles, the container is pressurized with a second gas other than oxygen, and the conduit is disengaged, leaving the container pressurized with the second gas. The first gas may be one of, or a mixture of carbon dioxide or nitrogen, and the second gas may be one of, or a mixture of carbon dioxide, nitrogen, hydrogen, helium, argon, methane, propane or butane.

In still another aspect of the invention a method for preserving a perishable material sensitive to oxygen is provided, comprising steps of (a) placing the perishable material in a container having an upper periphery; (b) engaging a pressurizing cover to the container via a gasket engaging the upper periphery, the cover connected by a conduit to a pressurized source of a first gas other than oxygen; (c) venting the container by lifting the pressurizing cover, thereby reducing the oxygen in the container by dilution; and (d) sealing a separate lid to the container to prevent air from entering the container.

In some embodiments of this method steps (b) and (c) are repeated to further reduce oxygen in the container. There may also be a one-way valve through the separate lid, wherein, after the separate lid is sealed to the container, the container is again pressurized through the one-way valve with the first gas other than oxygen. Also there may be a one-way valve through the separate lid, and after the separate lid is sealed to the container, the container is again pressurized, by a second gas other than oxygen. The first gas other than oxygen may be one of; or a mixture of carbon dioxide and nitrogen, and the second gas other than oxygen may be one of, or a mixture of carbon dioxide, nitrogen, hydrogen, helium, argon, methane, propane or butane.

In some cases of this method the one-way valve through the separate lid comprises a stem having an axis and a coaxial internal passage through the lid, the internal passage exiting the stem at a right angle to the coaxial passage and covered by a flexible sleeve over the outside diameter of the stem, such that gas introduced through the coaxial passage flexes the sleeve to enter the container, but gas within the container is prevented by the sleeve from exiting the container. In some cases the container and separate lid are metal, and the seal between the container and lid is a rolled and soldered seal. In other cases the container and separate lid are plastic, and wherein the seal between the container and lid is made by a heat sealing process. Also in some cases the one-way valve may be molded of a rubber-like material, and may further include an engageable/disengageable seal for mounting the one way valve to a hole through the separate lid.

In yet another aspect of the invention a system for treating to preserve a liquid perishable by exposure to oxygen is provided, comprising a first container for holding the liquid to be preserved, a second container for holding treated liquid, a conduit between the first and the second containers, and an injection nozzle in the conduit between the containers before the pump. In this system a gas other than oxygen is injected into the liquid as the liquid passes through the conduit, the gas mixing with the liquid and separating from the liquid in the second container, thereby reducing the level of concentration of oxygen in the treated liquid as compared to the untreated liquid.

In some embodiments of this system the second container is a closed container having a vent for venting gas from the second container. Also in some embodiments the second container comprises a connection to a filler apparatus for filling sealable containers with the treated liquid.

In yet another aspect of the invention a method for treating a liquid perishable by exposure to oxygen to preserve the liquid is provided, the method comprising the steps of (a) placing untreated liquid in a first container; (b) pumping the untreated liquid by a pump from the first container to a second container through a conduit; and (c) injecting a gas other than oxygen into the liquid passing through the conduit at an injection nozzle ahead of the pump, such that the gas entrains with the liquid, and separates from the liquid in the s second container, reducing the level of concentration of oxygen in the treated liquid as compared to the untreated liquid.

In some embodiments of this method the second container is a closed container having a vent, and gas separating from the treated liquid in the second container is vented. In some other embodiments the second container comprises a connection to a filler apparatus for filling sealable containers with the treated liquid, and treated liquid is provided to sealable containers through the connection.

In still another embodiment of the invention a one-way valve stem for a sealable container is provided, comprising a body having a central bore with an axial opening and a cross bore through the central bore providing at least one cross-bore opening from the central bore at about a right angle to the central bore, and a flexible sleeve covering the at least one opening of the cross bore, such that gas under pressure introduced into the central bore may flex the flexible sleeve and escape through the cross-bore opening, but gas may not travel from the outside of the sleeve into the cross-bore opening and into the central bore.

In some embodiments there is a physical interface between the axial opening and the cross-bore opening, the physical interface for sealing through a wall of a container or a lid for a container, such that when mounted through the wall or lid the axial opening is outside the container and the cross-bore opening covered by the flexible sleeve is inside the container. In some cases the body is made of rigid plastic, and in other cases may be made of a rubber-like material.

In some embodiments the physical interface comprises a flange for sealing between a bottle neck rim and the underside of a cap, and in some other embodiments the physical interface includes a rim for sealing to a round hole through a can lid.

In another aspect of the invention a system for preserving a perishable material sensitive to bacterial spoilage is provided, comprising a vacuum apparatus, a source of a pressurized gas, a pressurized source of a gas other than oxygen, and a container for the perishable material, the container having a sealable lid, wherein oxygen in the container is reduced by applying the vacuum apparatus to pump air out of the container, and the container is then pressurized by the pressurized source of gas other than oxygen, after which the container is sealed.

In some embodiments of this system a user-operable three-way valve system in a conduit leading from the container, the three-way valve system having a first, a second, and a third orifice providing a first, a second-and a third valve state, which in a first state connects the container with the vacuum apparatus, in a second state connects the container with the pressurized source of gas, and in a third state closes internal passage between all orifices. Also in some embodiments the pressurized gas is one of, or a mixture of, carbon dioxide, nitrogen, hydrogen, helium, argon, methane, propane or butane. The process may be automated by an apparatus with a pedestal for a food container, a translatable tubing providing a sealed compartment around the food container, a vacuum apparatus connectable to the compartment, a source of pressurized gas connectable to the compartment, and a mechanism for closing and sealing the container in the compartment.

In yet another aspect a method for preserving a perishable material sensitive to bacterial spoilage is provided, comprising steps of (a) placing the perishable material in a container; (b) reducing oxygen in the container by applying a vacuum pumping apparatus to the container; (c) pressurizing the container with a gas other than oxygen; and (d) sealing the container under pressure.

BRIEF DESCRIPTION OF THE DRAWING FIGURES

FIG. 3b is an elevation and sectioned view of the bottle closure shown in FIG. 3a.

DESCRIPTION OF THE PREFERRED EMBODIMENTS

Figure 1:
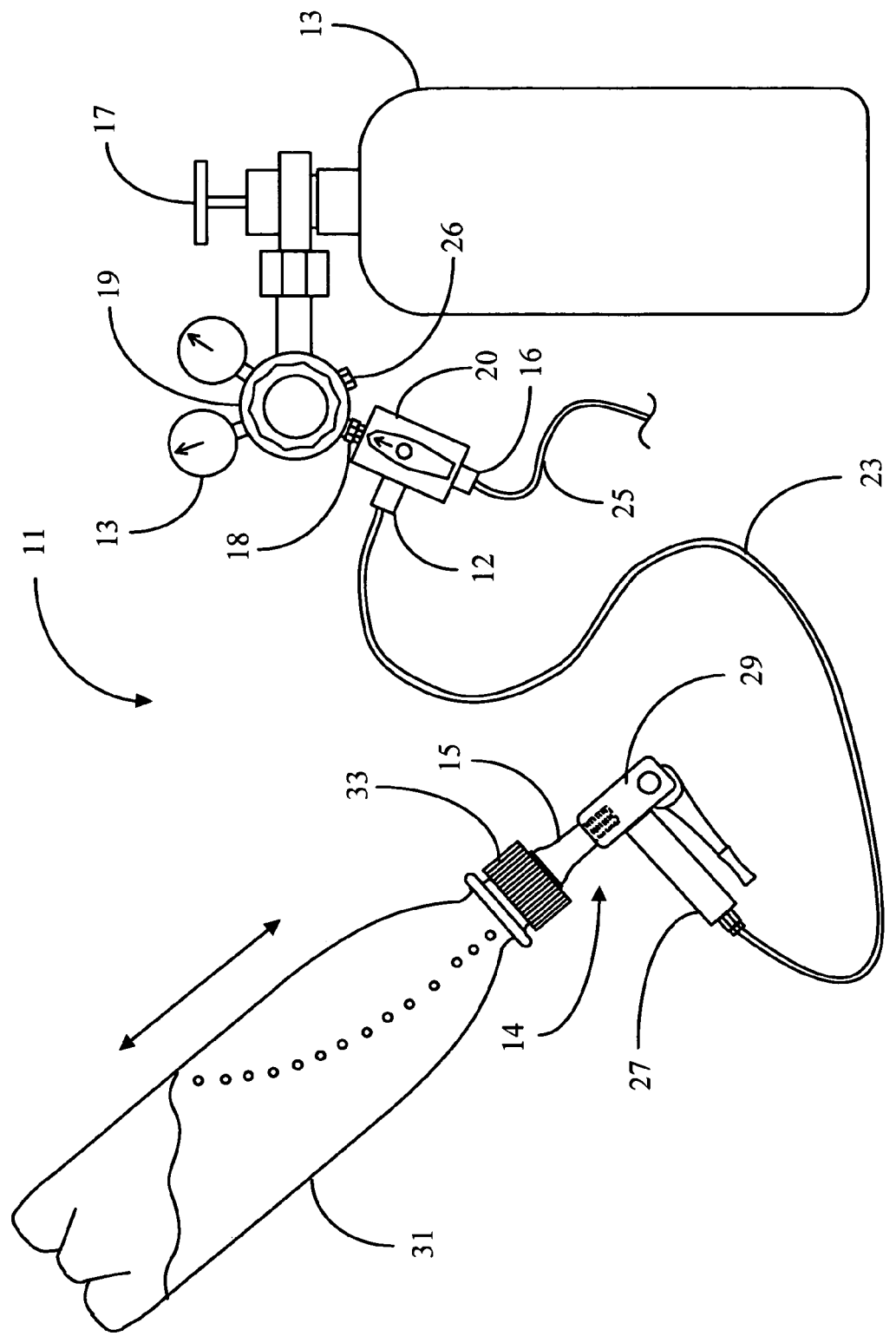
FIG. 1 illustrates an overall system for applying pressurizing gas to bottled liquid according to an embodiment of the present invention.

Referring now to FIG. 1, an improved carbonating system 11 is illustrated in this exemplary view, for applying pressurizing gas, in this case carbon dioxide, to a beverage held by a bottle container 31. It is to be understood that container 31 may hold any beverage or liquid for which carbonation is desired. Carbonator assembly 14 is provided for enabling the carbon dioxide from a supply source to enter container 31, and also for allowing for the release of gases from within container 31 under controlled conditions. Container 31 may be a bottle manufactured of plastic such as polyethylene terephthalate (P.E.T.) or may also be a glass bottle or any other container suitable for holding a beverage or liquid, such as a metal container.

Carbonator assembly 14 comprises a cap 33, valve stem 15, air chuck 29 and adapter 27, all of which are inexpensive and commercially available components. Cap 33 is screwably attachable to the threaded mouth of container 31 and is similar to a common screw-on cap for sealing a standard P.E.T. bottle, such as illustrated, with the exception that cap 33 is adapted for attaching valve stem 15 as detailed further below. Valve stem 15 is the same as those typically used for inflating the tires of bicycles or automobiles, and is adapted to engage to cap 33 providing a conduit for gases to enter or exit container 31, as is also described further below. Air chuck 29 is a standard, inexpensive and commercially available air chuck typically utilized for tire inflating apparatus such as automatic or manual tire pumps, and is provided in this embodiment for clamping and sealing onto the threaded end of valve stem 15, providing the conduit between valve stem 15 and adapter 27. Adapter 27 enables connection between air chuck 29 and flexible tubing 23, and provides a conduit for gases to pass thorough air chuck 29 and into bottle 31. Adapter 27 is adapted to restrict the flow of gases for purposes that are described further below.

Carbonator assembly 14 is coupled to a gas cylinder 13, which contains pressurized carbon dioxide, by flexible tubing 23, through a three-way valve 20. Gas cylinder 13 is a well-known conventional carbon dioxide supply tank, which typically will also comprise a shut-off valve 17, a pressure regulator 19, a safety release valve 26, and one or more of pressure gauges 13.

Three-way valve 20 is coupled to pressure regulator 19, providing a unique aspect of the present invention not found in prior art. Valve 20 has a total of three orifices and a rotary element for selectively channeling pressurized gases out of gas cylinder 13 during the carbonation process, or, by changing the position of the user-operable rotary element of the valve, for channeling gases from container 31 to the outside ambient atmosphere during a purge or dilution process, as described further below; and also in an intermediate position to block all orifices of the valve. In some embodiments of the invention valve 20 (or its equivalent) is a manually-operated valve, with a rotary element that a user may turn. In other embodiments the valve may be electrically-operable, with different positions initiated by a user pressing buttons and the like on a control panel.

Orifice 18 is an inlet orifice provided for attaching valve 20 to regulator 19, and for allowing gases to pass from regulator 19 into valve 20. Orifice 12 serves as an inlet and as an outlet orifice coupled to carbonator 14 by flexible tubing 23, through which pressurized carbon dioxide passes to container 31 during the carbonation process, and through which the gas mixture within container 31 may pass during the purge or dilution process. Orifice 16 is an outlet orifice provided for allowing the purged gases to be expelled into the ambient atmosphere, via flexible tubing 25. It will be apparent to the skilled artisan that a wide variety of three-way valves will be suitable for valve 20 within the spirit and scope of the invention.

As mentioned in the background section, it is desirable for the consumer to easily and inexpensively carbonate a non-carbonated beverage, or re-carbonate a carbonated beverage to restore the beverage's original taste. It is also desirable to substantially dilute or eliminate the air mixture in the space above the carbonated liquid within the bottle before the liquid carbonation step for the reasons mentioned above. The present invention provides a unique capability over systems and apparatus of prior art, provided by the means in which any air existing in the beverage container may be purged from the container before the actual carbonation process takes place, a means which eliminates the need to manually depress a valve on a carbonator apparatus, and simultaneously depress the sides of the container in order to expel air from within the container, as is typical in the prior art.

The basic steps embodied in the present invention comprise the first step of diluting the oxygen/nitrogen gases from the air space within container 31, releasing or purging the mixture of gases in the air space, and then re-pressurizing container 31 and entraining the pressurized gas, in this case carbon dioxide, into the liquid within container 31.

In actual practice of the present invention with reference to FIG. 1, container 31 is substantially filled in a conventional manner with a beverage or other liquid which is to be carbonated, leaving an air space within container 31 above the liquid to be carbonated, the air space typically comprises a mixture of oxygen and nitrogen gases. Then, beginning a dilution/purge step, container 31 is positioned upright such that the air space within container 31 is above the liquid to be carbonated and directly below the nozzle of container 31.

Cap 33 with valve stem 15 affixed thereto as described above, is then attached to the nozzle by screwably attaching cap 33 to the threaded nozzle portion of container 31, thereby sealing the contents of container 31, as the valve within valve stem 15 remains closed in its resting state by conventional spring action. Air chuck 29 is then secured to the threaded end of valve stem 15 in a conventional manner, thereby clamping and sealing air chuck 29 to valve stem 15, and opening the internal valve of valve stem 15, such that gases may flow into or out of the air space within container 31.

With carbonator device 14, comprising cap 33, valve stem 15, air chuck 29 and adapter 27, securely affixed to the nozzle of container 31, and adapter 27 coupled to the carbon dioxide supply source via flexible tubing 23 and three-way valve 20, carbon dioxide is applied by opening shut-off valve 17 of cylinder 13 and selecting the switch position of three-way valve 20 such that a conduit is opened between cylinder 13 and container 31 allowing carbon dioxide to be forced from the cylinder 13, through three-way valve 20 and flexible tubing 23, through carbonator assembly 14 and finally into the air space within container 31.

Figure 4B:
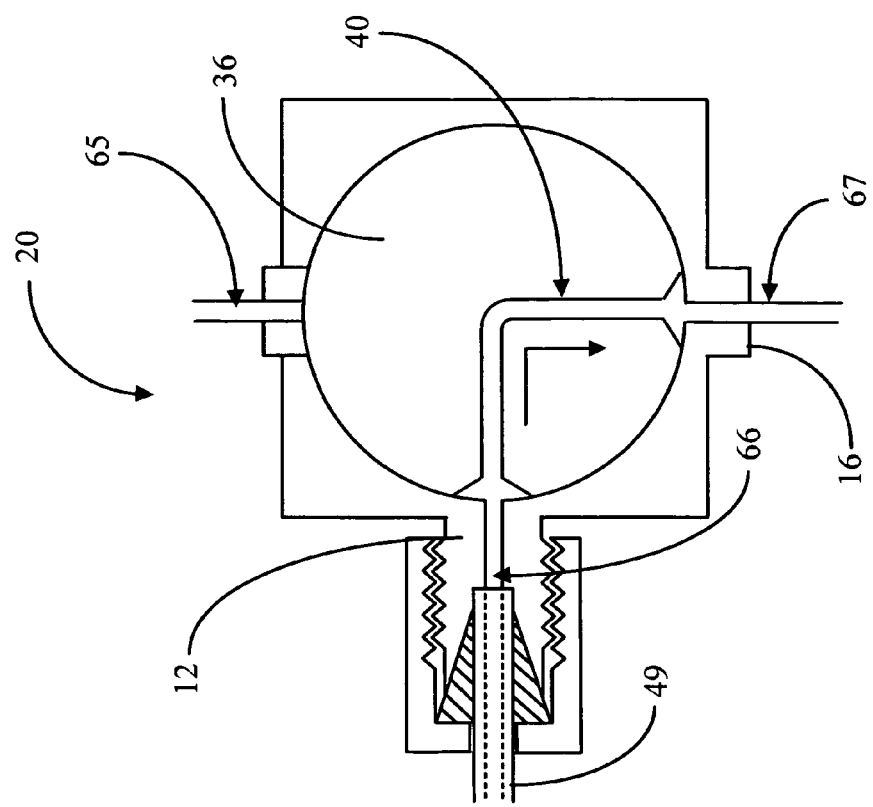
FIG. 4b illustrates the three-way valve of FIG. 4a, set in a purge position.

As is well-known, the air space above the liquid to be carbonated within container 31 comprises mainly a mixture of oxygen and nitrogen, which are undesirable elements when carbonating certain beverages for consumption, the oxygen being a particular problem. It is an object of the first pressurization step to dilute the gaseous mixture for the purpose of purging the mixture from within container 31. Once all connections are made between container 31 and a carbon dioxide supply source, carbon dioxide is applied to container 31 until the air space above the liquid to be carbonated is pressurized to a factor of about six times atmosphere pressure in a preferred embodiment, or approximately 90 psi., which in turn, dilutes the oxygen/nitrogen ratio within the air space by a factor of six. The rotary element of valve 20 is then turned to an intermediate position which closes all three orifices, as shown in FIG. 4c described in further detail below.

Once the air space is pressurized by application of the carbon dioxide, the gaseous mixture containing oxygen/nitrogen along with the applied carbon dioxide is purged from the space above the liquid to be carbonated. This is accomplished by setting the switch position of three-way valve 20, which creates a conduit within three-way valve 20 leading from inlet/outlet orifice 12 to outlet orifice 16, which is connected to flexible tubing 25 leading to the outside atmosphere. Once this setting is accomplished in three-way valve 20, the pressurized gaseous mixture within container 31 may then pass to the outside atmosphere, and the pressure in the bottle returns to one atmosphere.

One unique aspect of the present invention, as described above and illustrated further below in greater detail, is that adapter 27 of carbonator assembly 14 utilizes a coupling having an internal passage which has a substantially smaller diameter then those used for a conventional air chuck adapter, such that the escaping gaseous mixture flow out of container 31 is restricted so that the gaseous mixture is allowed to escape into the atmosphere at a rate slow enough to prevent frothing of the liquid contents within container 31 during the purge process.

Once the gaseous mixture in the space above the liquid within container 31 has been substantially purged from container 31, the pressurization and dilution/purge process may be repeated to further dilute the small amount of oxygen/nitrogen remaining in the space, again by a factor of six. The process may be repeated as many times as suits the user's purpose, depending on the type of liquid within container 31, and many other factors.

Once the ratio of oxygen/nitrogen to carbon dioxide is low enough to suit the purpose, the next step of re-pressurization of the contents of container 31 may begin, which will carbonate or re-carbonate the liquid contents of container 31. To begin the re-pressurization step, the switch setting of three-way valve 20 is set such that a conduit is open between the carbon dioxide supply source from pressure regulator 19, and carbonator assembly 14, all other passages being closed. Carbon dioxide is then applied to the air space within container 31, which is still in the upright position, by turning the rotary element of valve 20 to the position that connects the gas cylinder 13 with bottle 31. The air space within container 31 is then re-pressurized with the carbon dioxide to the desired factor. At this point, assuming one or more pressure/purge steps have been accomplished, the ratio of air (oxygen/nitrogen) to carbon dioxide in the airspace is very low.

Pressurized container 31 is now inverted and shaken such that the predominately carbon dioxide gaseous mixture in the space above the liquid to be carbonated is entrained into the liquid, thereby carbonating the liquid. As a final step the pressure is released, again slowly, the valve 20 is set to the intermediate closed position, and carbonator assembly 14 may then be disconnected from the nozzle portion of container 31, and a conventional sealing cap may then be screwably attach to the nozzle of container 31, thereby sealing the carbonated liquid contents within. Alternatively, the air chuck 29 may be disconnected from the valve stem of the bottle closure assembly, and the bottle closure assembly left as the seal for bottle 31.

Figure 2:
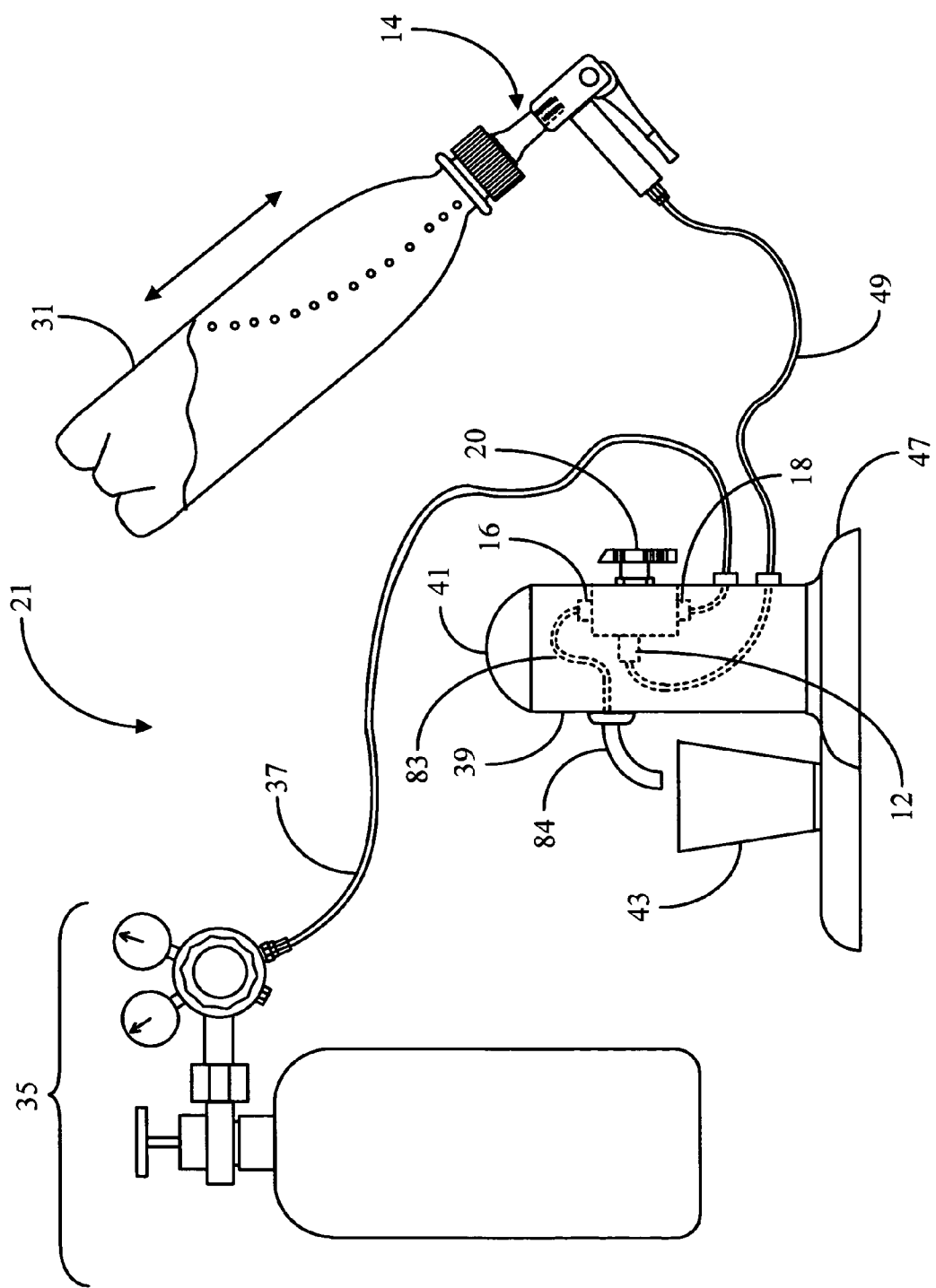
FIG. 2 illustrates an overall process for applying pressurizing gas to bottled liquid according to an alternative embodiment of the present invention.

FIG. 2 illustrates an overall process for applying pressurizing gas to bottled liquid according to an alternative embodiment of the present invention. Carbonator system 21 comprises many of the elements of FIG. 1, and such elements accordingly will not be given further elaborate description. In the alternative embodiment illustrated, three-way valve 20 is enclosed in a housing assembly instead of coupling directly to the pressurized carbon dioxide source, as in FIG. 1, adding further convenience and ease-of-use in that the user may operate three-way valve 20 remotely from a carbon dioxide source, and then capture any residual liquid which escapes along with the diluted and purged gaseous mixture from container 31 during the previous dilution/purge process prior to the liquid carbonation step.

In the alternative embodiment illustrated in FIG. 2, carbon dioxide supply source 35 comprises all of the elements illustrated and described relative to FIG. 1, including a gas cylinder whose output is controlled by a shut-off valve, and a standard pressure regulator with pressure gauges. Container 31 holding liquid to be carbonated is sealed with carbonator assembly 14, which is coupled to three-way valve 20 within housing 39 via flexible tubing 49. Flexible tubing 49 extends from carbonator assembly 14 through the wall of housing 39, into the interior of housing 39 and is then connected to the inlet/outlet orifice of valve 20, valve 20 being mounted within housing 39 to the wall of the housing, with the actuator lever on the outside accessible by the user.

Housing 39 in the embodiment illustrated is cylindrical in shape and substantially hollow within, and has a dome-shaped 41, which is removably attached to housing 39 allowing user access to the valve components and tubing within housing 39. Housing 39 is supported by a base 47, which also provides a resting place for a container 43 which has the purpose of capturing any residual liquid that may be expressed along with purged gases from container 31 during the dilution/process mentioned previously. It is noted that the shape and dimensions of housing 39 is not important in practicing the present invention, and may take the form of many different shapes and sizes without departing from the scope and spirit of the present invention.

Within housing 39 a length of flexible tubing 83 is coupled to outlet orifice 16 of three-way valve 20, and leads to an external nozzle 84 for the purpose of directing any residual liquid expressed during the purge process into container 43.

Gas pressure source 35 is coupled to inlet orifice 18 of three-way valve 20 via flexible tubing 37, which couples directly to the regulator of gas pressure source 35, and leads to and extends through the wall of housing 39, and then connects directly to inlet orifice 18 of valve 20.

In practicing this alternative embodiment of the present invention as illustrated in FIG. 2, the method steps for dilution/purging of the oxygen/nitrogen within the air space of container 31 and re-pressurization for carbonating the liquid within, are the same as those for system 11 of FIG. 1, with the exception that three-way valve 20 is operated from housing 39 as opposed to being coupled directly to the pressurized gas supply source, as in FIG. 1, and the flexible tubing configurations are adapted to accommodate such an arrangement.

Figure 3A:
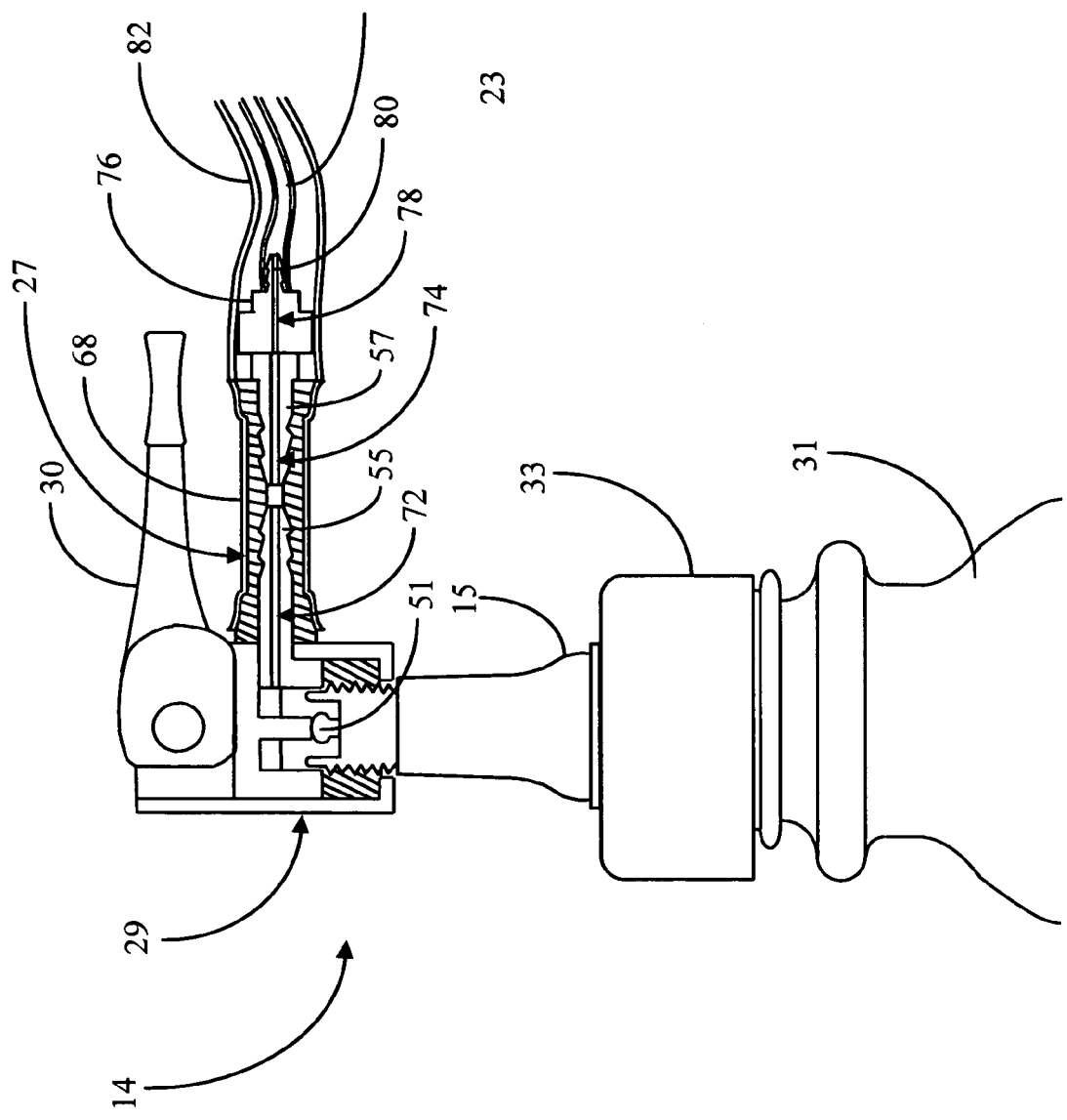
FIG. 3a is an elevation view of a portion of FIG. 1 or FIG. 2, showing detail of a bottle closure according to a preferred embodiment of the invention.

FIG. 3a illustrates in detail bottle carbonator closure assembly 14 of FIG. 1, affixed to the nozzle of container 31 according to an embodiment of the present invention. In this illustration an enlarged, cross-section view is given to better illustrate internal key elements of carbonator assembly 14 which provides the present invention the unique capabilities described above over carbonator apparatus of prior art.

As mentioned with reference to FIG. 1, cap 33 is a conventional threaded bottle cap modified for attaching carbonator closure assembly 14, and valve stem 15 is a common, commercially available valve stem typically used for inflating the tires of bicycles or automobiles. Specifically, a round through-opening is formed through the upper portion of cap 33, its circumference slightly less than the outside diameter of the mounting collar of valve stem 15, such that a tight and secure fit is achieved when valve stem 15 is attached to cap 33 as illustrated. Commercially-available valve stems are notoriously well-known in the art. Some further detail of the valve stem interface to the bottle and cap is shown in FIG. 3b described below.

As described previously valve stem 15 is a conventional and commercially available valve stem, having a passage open to the interior of container 31 and extending up through the body of valve stem 15 extending to an internal valve portion (not shown) within valve stem 15, the valve portion, as is conventional, held in a resting closed state by spring action. Valve stem 15 also conventionally includes a valve actuated by pin 51 which is urged upwards in its resting state by spring action, thereby closing the internal valve mechanism, and may be depressed down into valve stem 15 in order to open the internal valve mechanism.

Air chuck 29 is shown in the illustration attached to the upper threaded portion of valve stem 15 in a conventional manner, and actuating lever 30 is in the clamping horizontal position, which seals the opening of air chuck 29 around the upper threaded portion of valve 15, while simultaneously actuating a protrusion which depresses valve pin 51 which opens the internal valve mechanism of valve stem 15.

A conduit is thereby opened between the space within container 31 and adapter 27. As mentioned earlier, adapter 27 is similar to those used conventionally in air chucks known in the art, with the exception that a special nozzle 57 attachable to adapter 27, is utilized in order to significantly reduce the flow rate of gases escaping from container 31 during a purge process, as detailed above. Specifically, adapter 27 comprises a nozzle 55 and a nozzle 57 which are similar to those of known adapters of conventional art, nozzle 55 having a passage 72 extending their through, and nozzle 57 having a similar passage 74.

A unique aspect of adapter 27, however, is the application of a special nozzle adapter 76 which has a passage 78 extending therethrough providing a restricted orifice, which has an inside diameter significantly less than that of passages of nozzles of conventional air chuck adapters, such as passages 72 and 74. The inside diameter of passage 78 is significantly less in area than passages 72 and 74, in order to substantially slow the release of gases escaping from container 31 during the purge process, for the purpose of preventing frothing of carbonated liquid within container 31, which would otherwise occur during a purge step utilizing a large opening as is conventionally used in a common, commercially available air chuck.

It has been determined through empirical testing that the inside diameter of passage 78 is ideally between $1/16$ inch and $3/64$ inch. However, said dimension may vary in alternative embodiments, providing that the flow of escaping gases from within container 31 is substantially curtailed when the internal valve mechanism of valve stem 15 is open during the purge process, in order that frothing of the liquid within the container during purge is substantially reduced or eliminated.

Adapter 27 further comprises in this embodiment a rubberized enclosure surrounding and securing together nozzles 55 and 57, the rubberized enclosure encased by a tubular collar 68. It is herein noted that adapter 27 is a conventional, commercially available adapter typically used with common air chucks such as air chuck 29. The special nozzle adapter 76, having passage 78 with a significantly reduced diameter to provide a restricted orifice is adapted to couple to nozzle 57, and has a small nozzle 80, which has an opening having a diameter equal to that of passage 78. One end of flexible tubing 23 has an inside diameter slightly less than the outside diameter of nozzle 80 such that the end of tubing 23 may be fitted securely over nozzle 80, tubing 23 leading to, and coupled to three-way valve 20 and ultimately to the carbon dioxide supply source. A rubberized protective sheath 82 is utilized to protect the connection between flexible tubing 23 and special nozzle fitting 76, one end of sheath 82 slipping securely over the end of nozzle fitting 76, and extending partially along the length of, and enclosing flexible tubing 23.

The detail shown in FIG. 3b is for a closure using a commercially available valve stem, as described above. There are a number of alternative ways the closure may be accomplished, however, within the spirit and scope of the invention. FIG. 3c, for example is an elevation and sectioned view of a bottle closure in an alternative embodiment of the invention. In the alternative embodiment of FIG. 3c a proprietary plastic valve stem 24 is provided comprising all of the elements of a conventional valve stem, plus a cap portion for interfacing to the threaded nozzle of a bottle. A washer 28 of rubber or other flexible material serves as a sealing element between bottle 31 and stem 24, and a sliding washer 32 facilitates assembly and disassembly.

Figure 3D:
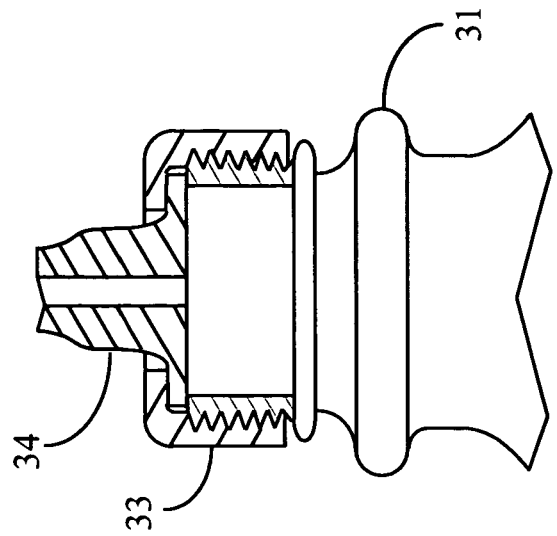
FIG. 3d is an elevation and sectioned view of a bottle closure in another alternative embodiment of the invention.
Figure 3C:
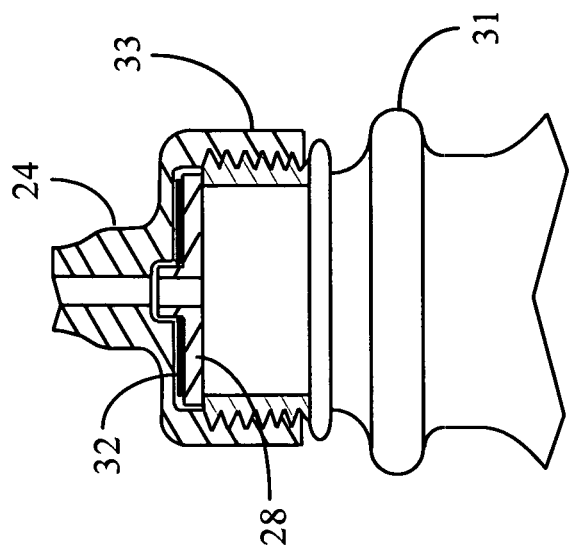
FIG. 3c is an elevation and sectioned view of a bottle closure in an alternative embodiment of the invention.
Figure 3B:
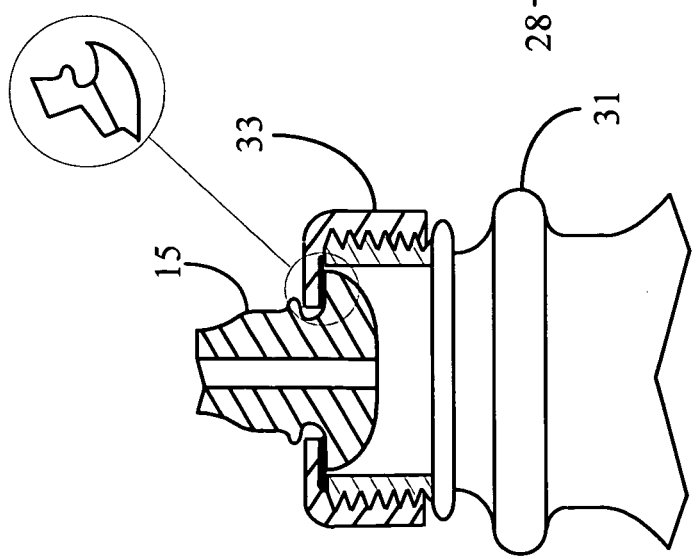

FIG. 3d is an elevation and sectioned view of a bottle closure in yet another alternative embodiment of the invention. In FIG. 3d a proprietary valve stem 34 comprising rubber or other flexible material and having a circular sealing wing fitting between bottle 31 and cap 33 is provided, having all of the necessary valve stem elements. There are thus three different embodiments shown as examples of valve stems and interfacing valve stems to a bottle. These three are parts of a larger set of possible designs that might be used.

Figure 4A:
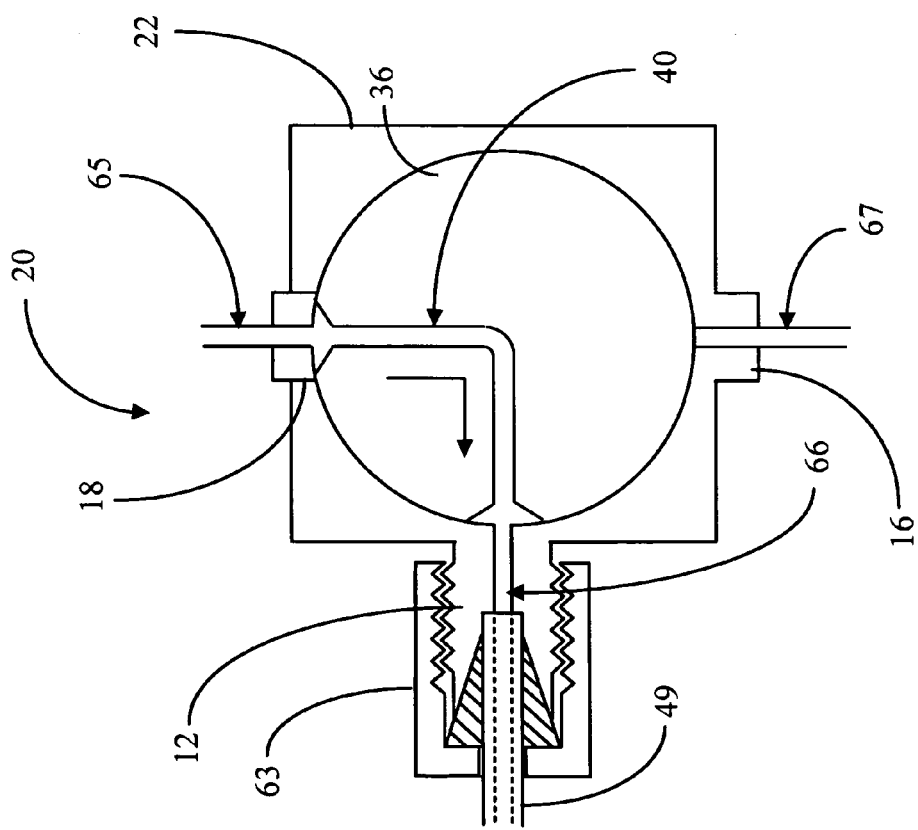
FIG. 4a illustrates a three-way valve utilized in the carbonating system of the present invention, set in a pressurize position.
Figure 4C:
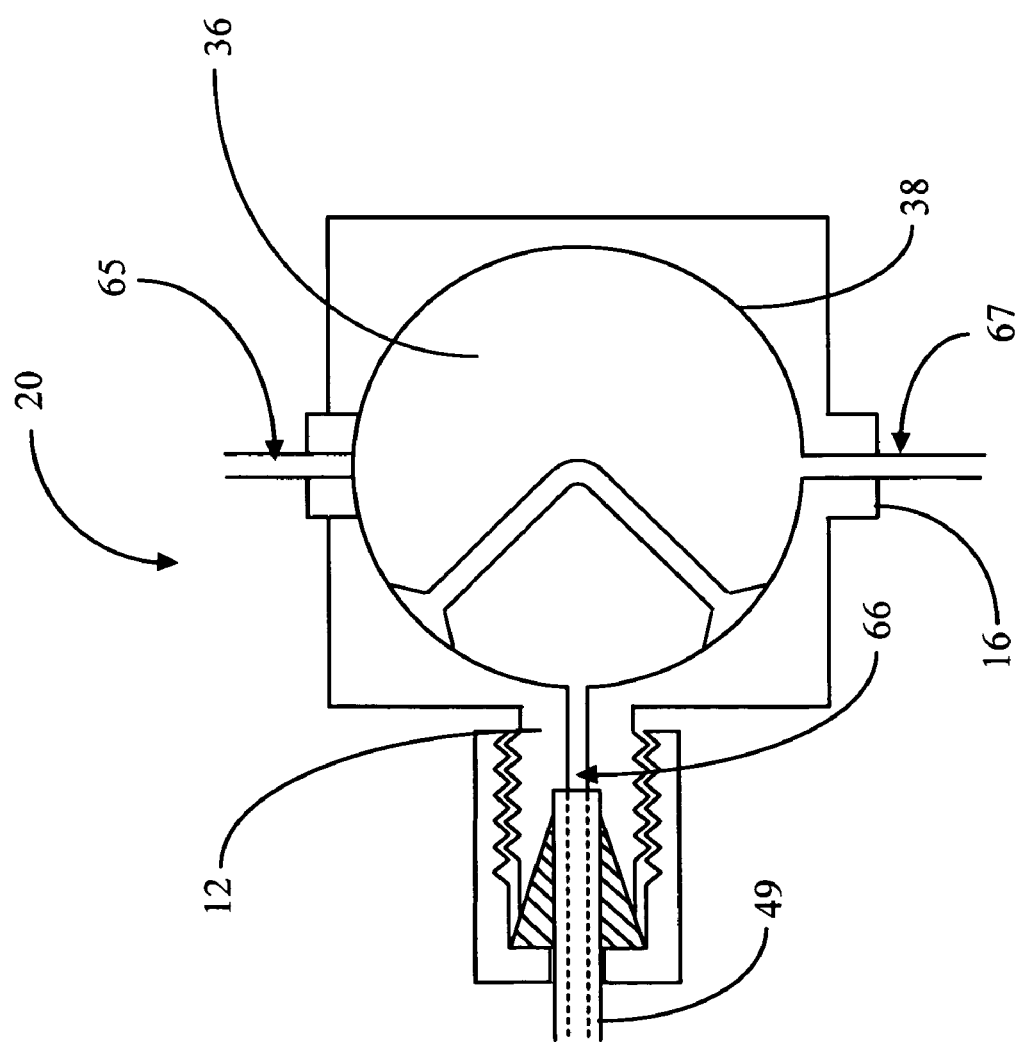
FIG. 4c illustrates the three-way valve of FIGS. 4a and 4b, set in an intermediate position in which all passages are blocked.

FIG. 4a illustrates a three-way valve utilized in the carbonating system of the present invention, set in the pressurize position. In this exemplary view, three-way valve 20 of FIGS. 1 and 2 is illustrated, having an enclosure 22, an internal rotary element 36 having passages therein, inlet orifice 18, inlet/outlet orifice 12, and outlet orifice 16. Orifice 16 accommodates passage 65, which leads to the carbon dioxide supply source. Although detail is not shown in this exemplary view, it may be assumed that orifices 16 and 18 have threaded outer portions and utilize a standard threaded coupling such as coupling 63 which secures flexible tubing 49 to orifice 12. As described briefly above, the valve may be either a manually-operable valve or an electrically-operable valve.

In the simplified illustration element 36 is in the charge, or pressurize position, wherein pressurized carbon dioxide from the supply source enters passage 65 through inlet orifice 18, into passage 40 of element 36, and then out through inlet/outlet orifice 12 via passage 66 and into flexible tubing 49 wherein the pressurized carbon dioxide passes to air chuck 29 connected to the nozzle of bottle container 31, as in FIG. 1. The position of element 36 within three-way valve 20 is the position used in the first pressurization step in preparation for the dilution/purge step as outlined above, as well as the final pressurization step following the dilution/purge step.

FIG. 4b illustrates three-way valve 20 of FIG. 4a, set in the purge position. The setting of element 36 within valve 20 in this illustration is utilized during the dilution/purge process, wherein pressurized gases within the air space above the liquid held by bottle container 31 are allowed to escape container 31 and eventually pass to the outside atmosphere. In this setting, the escaping gases pass from container 31 through carbonator device 14 as described above, through flexible tubing 49, and then enters internal passage 40 via inlet/outlet orifice 12, and then out of valve 20 via outlet orifice 16, into outlet passage 67 and eventually into the outside atmosphere.

FIG. 4c illustrates valve 20 of FIGS. 4a and 4b with rotary element 36 set in an intermediate position wherein all orifices are closed, that is, no internal passage connects any two orifices.

Figure 6:
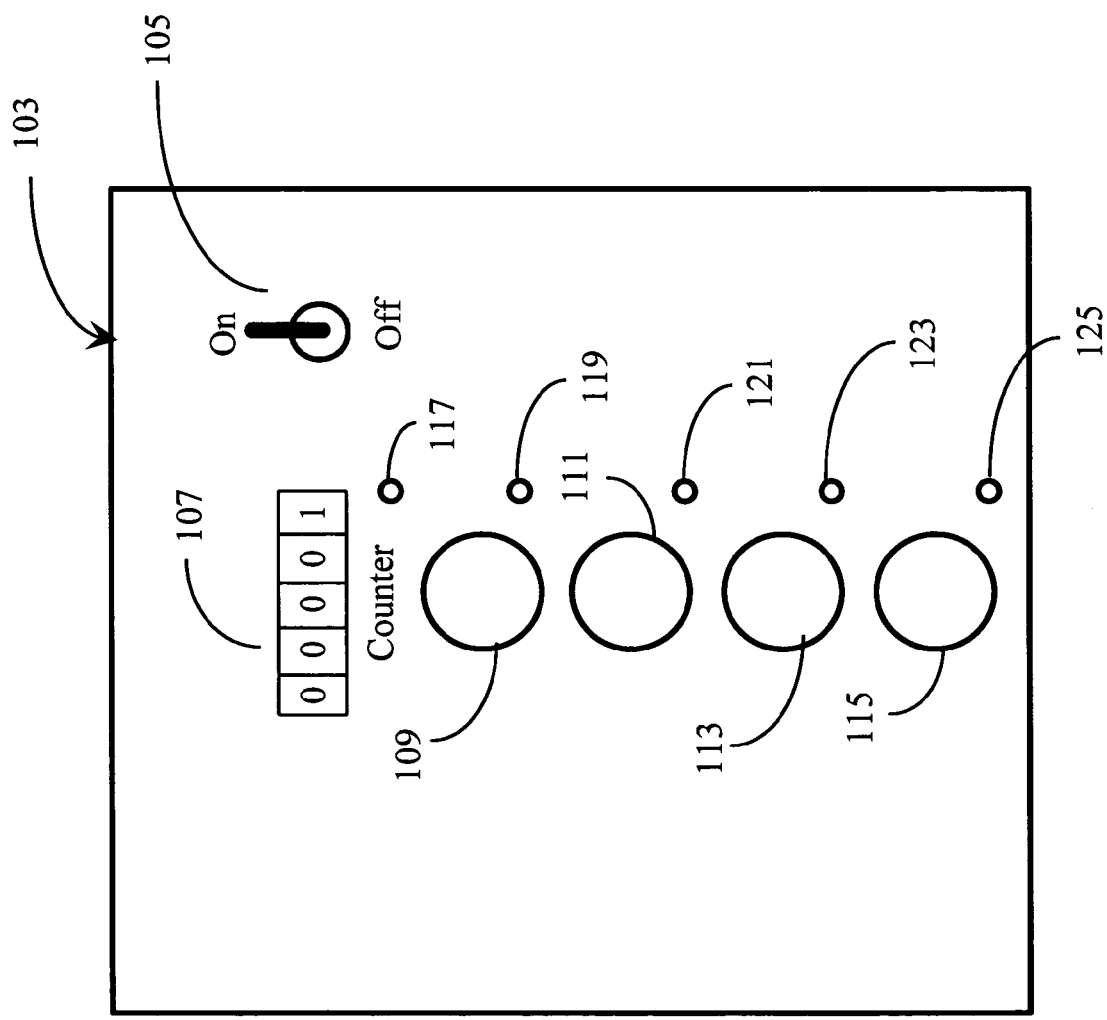
FIG. 6 is an illustration of a control panel in an embodiment of the invention using an electrically-operable three-way valve.

As described above, the three-way valve may be in some embodiments an electrically-operable valve. FIG. 6 is an illustration of a control panel usable with an embodiment incorporating an electrically-operable three way valve. In one alternative the electrically-operable three-way valve is structurally similar to the rotary valve described and shown in FIGS. 4a, 4b and 4c, and the internal rotary element (36) is rotated by an electrical rotary actuator. In this case assume as a starting point that the internal rotary element is in the position shown in FIG. 4c, blocking all internal passages.

Referring to FIG. 6, control panel 103 has an on-off switch 105. When the power switch is on and power is applied, green LED 117 will be lit. A timer-counter 107 is provided to allow an operator to time application of gas to a beverage. Assuming a beverage has been added to container 31 and the air chuck is in place, the user presses button 109. This opens the three-way valve to the position of FIG. 4a, applying pressurized gas to bottle 31, and also lights green LED 119. This also starts the timer-counter. The user now shakes the bottle lightly and upright for a prearranged time, which may be timed watching the timer-counter. This is the dilution step.

After the pre-arranged time, the user presses button 111, which moves the rotary valve to the position shown in FIG. 4b, allowing the gas in container 31 to purge to atmosphere. Yellow LED 121 lights indicating the purge state (green LED 119 goes out).

Now the user presses button 113. Green LED 123 lights and yellow LED 121 goes out. The rotary valve returns to the pressurize position shown in FIG. 4a and the timer resets. The user now moves the bottle to an upside-down position and shakes the bottle vigorously several times, which may be counted or timed using the counter as well. This is the carbonation step.

Now the user presses button 4. The rotary valve moves first to the purge position (FIG. 4b) to allow the pressure in the container to purge, then to the closed position shown in FIG. 4c, which was the starting position. The user can now remove the air chuck and cap the bottle or use the contents. The system is back in its start position.

Figure 7:
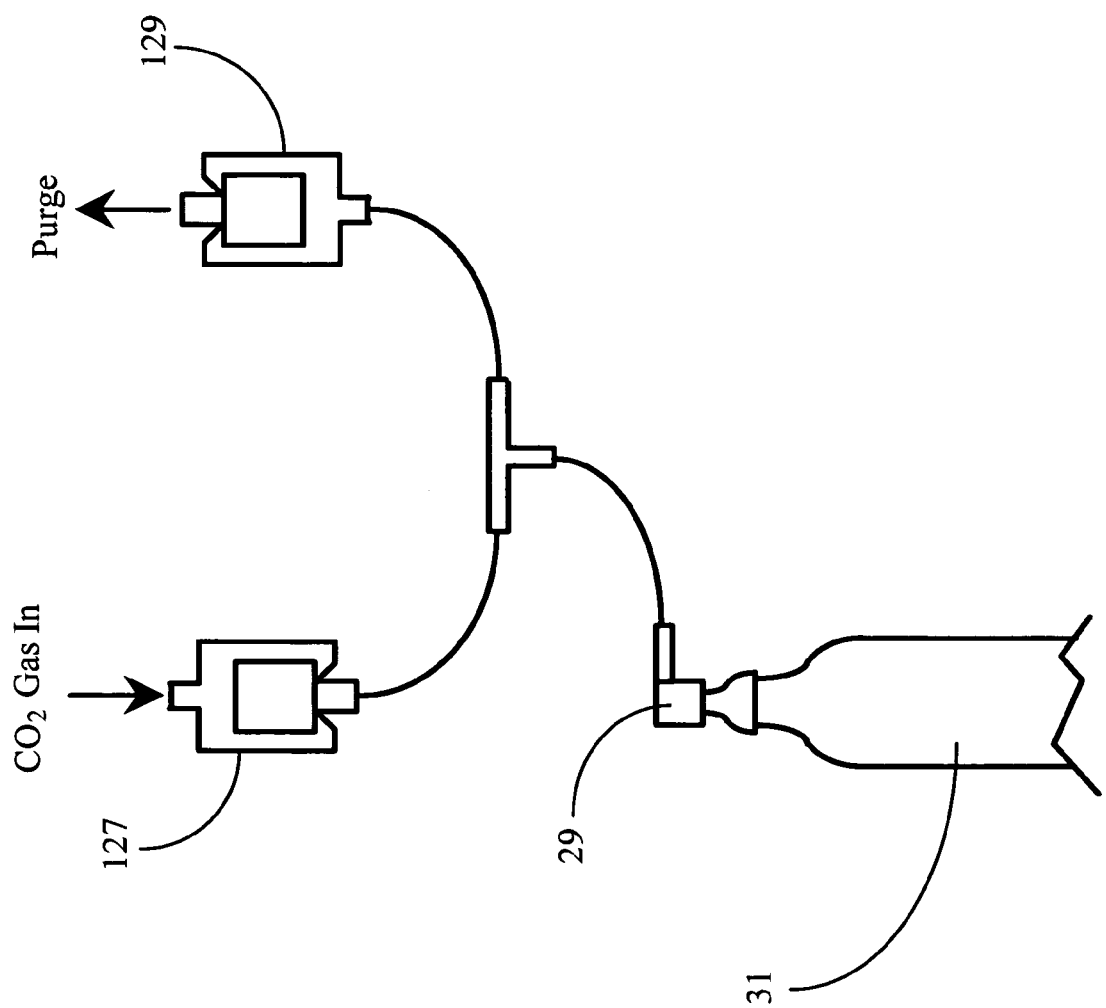
FIG. 7 is a flow diagram illustrating steps in an operation of carbonating a beverage in an embodiment of the invention using the control panel of FIG. 6 and an electrically-operable three-way valve.

In an alternative embodiment the three-way valve action is provided by two solenoid-operated valves 127 and 129 connected by a tee 131 to the container 31 through the air chuck 29 (FIG. 1) as shown in FIG. 7, rather than by a rotary element as described above. In this case the operation of the buttons closes both valves 127 and 129 to provide the function of position 4c of the rotary valve, and opens valve 127 or 129 selectively to provide the functions of the rotary valve in positions shown by FIGS. 4a and 4b. The result is the same as described above for the rotary valve.

Figure 5:
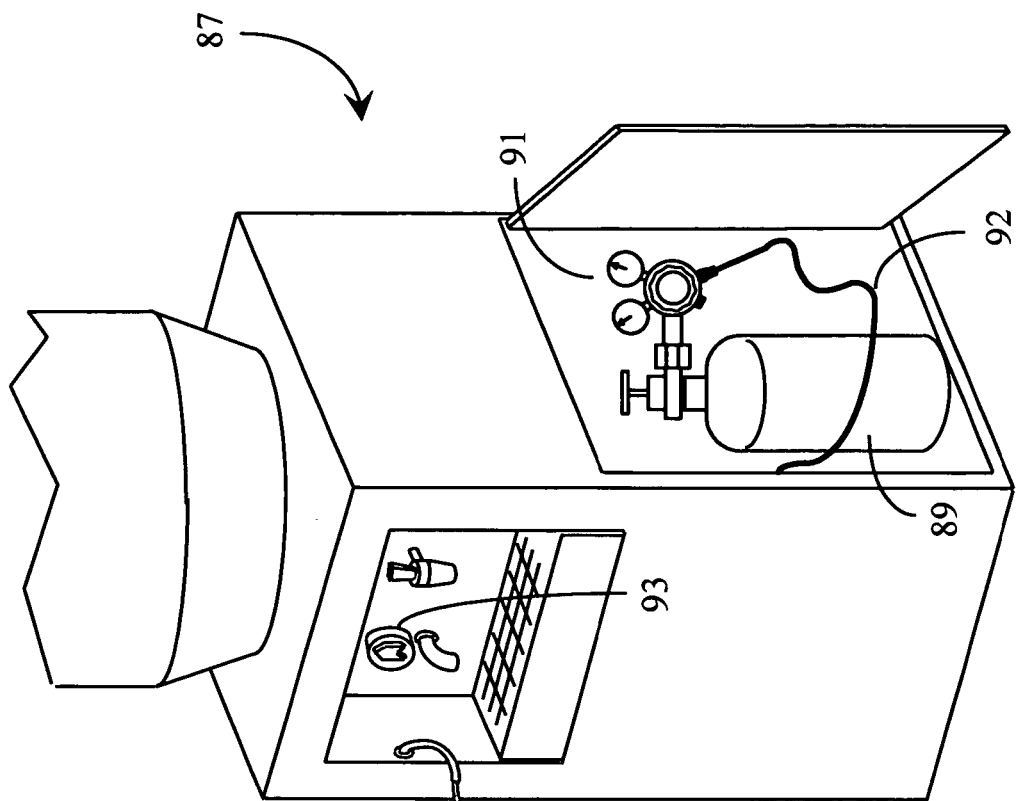
FIG. 5 illustrates a carbonating apparatus according to an embodiment of the present invention, integrated with a water-cooler.

In a further alternative embodiment of the present invention, as shown in FIG. 5, a carbonation system according to the invention is integrated with a water cooler. In this embodiment carbon dioxide pressure cylinder 89 with shut off valve and pressure regulator assembly 91 is housed within the lower cabinet of the water cooler. The pressure cylinder is connected by the conduit 92 to a three-way valve 93 mounted behind a wall of the cooler. The three way valve may be mounted in any of several places, as long as it is readily accessible to a user.

From the three way valve a conduit 95 extends to adapter 97 which attaches to a detaches from valve stem 99 in a cap for bottle 101. Operation in this case is the same as described above for other embodiments, including purging and dilution by one or more pressurization and purge cycles to reduce the amount of air in the space over the liquid in bottle 101, after which the bottle is pressurized with carbon dioxide again, and the bottle is shaken to entrain the carbon dioxide in the liquid. Then the pressure is released slowly as above-described. Integration with the water cooler allows for carbonating the water drawn from the water cooler to improve the sensation and taste.

Although a certain and specific apparatus and method is illustrated and described herein for carbonating beverages and the like, it is to be understood that a variety of modifications may be made without departing from the spirit and scope of the invention. Accordingly, many different applications other than carbonating beverages for consumption, for example, may benefit from the present invention without departing from the overall spirit and scope of the invention.

In another embodiment of the present invention a process and apparatus is provided for preserving particularly foodstuffs, such as grain, nuts, snacks, beverages and the like, extending to substantially any materials that may be expected to deteriorate by the action of oxygen in the atmosphere, or to spoil by some action of process that is aided or accelerated by oxygen in particular.

Figure 8:
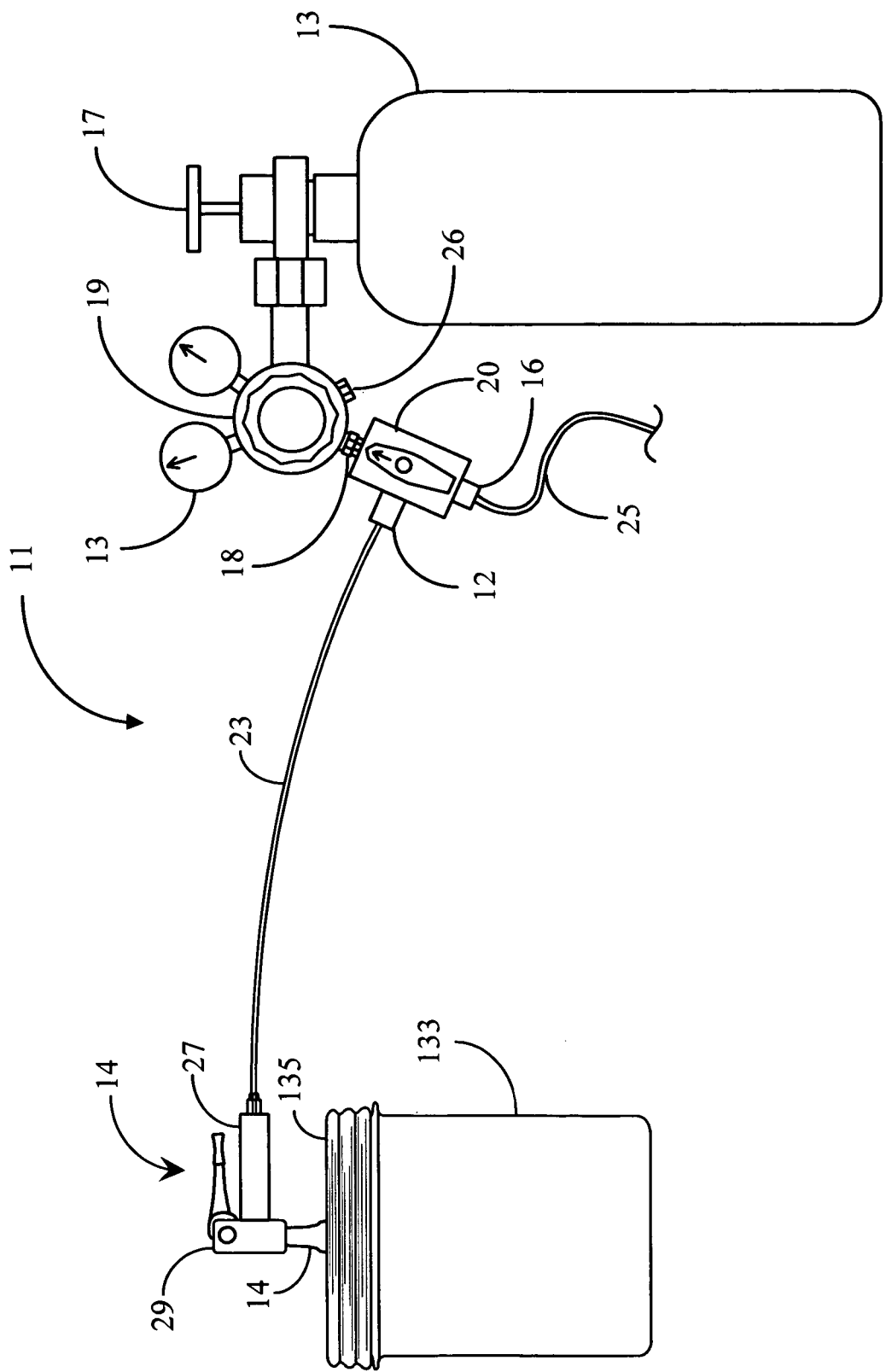
FIG. 8 is an elevation view of a carbonation system used for preserving beverages and foodstuff according to an embodiment of the present invention.

FIG. 8 is similar to FIG. 1 of the present application, and uses many of the same elements, except that a container 133 is provided having a removable and sealable lid 135, with the lid having an integrated valve stem 14 of the same sort as described in apparatus described above, and as used commonly for such as automobile tires. This valve stem, as is well-known, has a spring-loaded valve which is held closed both by a compression spring and by pressure in the container (tire etc.) to which it is applied.

Container 133 may be of many different sorts, for example as a common canning jar with a wide threaded mouth. Lid 135 in this particular example is of a diameter to engage the threads of the threaded mouth of container 133, and there is an intervening gasket, not shown, as is also common in preserving containers of this sort. A difference between common lids and lid 135 is that lid 135 has the valve stem 14 sealed therethrough.

In the embodiment shown an air chuck 29 and adapter 27, which are inexpensive and commercially available components, are attached to valve stem 14, and adapter 27 is connected as previously described to a three-way valve 20 and a gas pressure regulator 19, which is connected in turn to a source of gas at high pressure in a container 13.

A purpose of the wide-mouth container 133 is to provide a sufficient opening for foodstuff to be inserted for processing to preserve. In many cases the mouth need not be so large, and in some cases the larger mouth is a requirement. For example, one might wish to process whole tomatoes or sectioned apples or other fruit or vegetables, in which case the wide mouth will be an advantage. In other cases one might wish to process a fruit or vegetable juice, for example, or other sort of liquid or semi-liquid material; in which case there need by only a sufficient opening for introducing the material into the container. So FIG. 8 is only exemplary in regard to the container, and containers of many other sorts may be used to advantage in particular cases.

To preserve foodstuff using the apparatus generally as shown in FIG. 8, in one example one removes lid 135 from container 133 and places the foodstuff to be processed inside, leaving a space over the foodstuff, then replaces lid 135 carefully to be sure the lid is sealed to the container. Next, the valve 20 is turned to the position wherein a pressurized first gas other than oxygen in container 133 is applied through conduit 23 to and through adapter 27, chuck 29, and into container 133. At the beginning the pressure in container 133 is one atmosphere pressure.

In one example the pressure in container 133 is raised to two atmospheres of the first gas other than oxygen. Now valve 20 is set to the position at which container 133 is vented through conduit 25 back to one atmosphere. In this process the amount of oxygen in container 133 is lowered to ½ of the previous amount. Now a second gas other than oxygen is introduced into container 133 again at two atmospheres, valve 20 is turned to the "off" position, and chuck 29 is operated to remove the chuck from valve stem 14. The one-way valve in valve stem 14 closes in the removal process, and container 133 now remains with the foodstuff under a charge of the second gas with oxygen greatly reduced from the original amount, and the container pressurized with a mostly benign gas. The inventor has determined that foodstuff thus processed may be kept for one month without spoilage, and longer if also refrigerated.

In the example above the pressurizing first gas is carbon dioxide, and the pressure is 2 atmospheres, the pressure cycle performed once. This is merely an example. The pressurizing process is a dilution process, as described above. By pressurizing the container (the gas in the air space over the foodstuff), to two atmospheres, when the pressure is released, the oxygen in the space is reduced to one-half of its original amount. If the pressure were to three atmospheres (about 46 psi) then the oxygen, by one pressure and release cycle, will be one third of the former amount. It will be apparent to the skilled artisan that the pressure may vary considerably in the dilution process. Further, as also described above, there may be more than one pressure/release cycle. For example, if the pressure in the container is doubled, then released, the dilution is to one-half the former concentration. If the cycle is repeated again in the same way the dilution is to one-quarter the original concentration, and so on. The pressure and the number of cycles may be tailored to any reasonable purpose.

In addition, although release after pressurizing is necessary to dilute the amount of oxygen left in the container, it is not necessary to leave the container at atmospheric pressure. In some cases it is preferable to re-pressurize the container after dilution, and to leave the container pressurized after processing.

Further to the above, the pressurizing gas is not limited to carbon dioxide. The gas may be nitrogen or any other relatively benign gas other than carbon dioxide, although nitrogen or carbon dioxide are preferred. There may, however, be some preferences depending on the nature of the beverage or food to be processed. The inventor has determined, for example, that carbon dioxide is preferable for grain as a first pressurizing gas for grain, as the carbon dioxide will help to kill bugs and their eggs that normally infest grain. Also the re-pressurizing second gas need not be the first pressurizing gas. For example, grain might be treated by pressurizing a container of grain to two atmospheres with carbon dioxide, then releasing the pressure, and then re-pressurizing with nitrogen rather than with carbon dioxide. For nuts the pressurization and release to get rid of oxygen rids the product of an odor of oxidized oil. Of course re-pressurizing with a second gas other than the first gas will entail removing air chuck 29 and connecting a pressurized source of a second gas.

In some embodiments the second gas may be one of, or a mixture of carbon dioxide ($CO_2$), nitrogen ($N_2$), hydrogen ($H_2$), helium (He), argon (Ar), methane ($CH_4$), propane ($C_3H_8$) or butane ($C_4H_{10}$).

Figure 9:
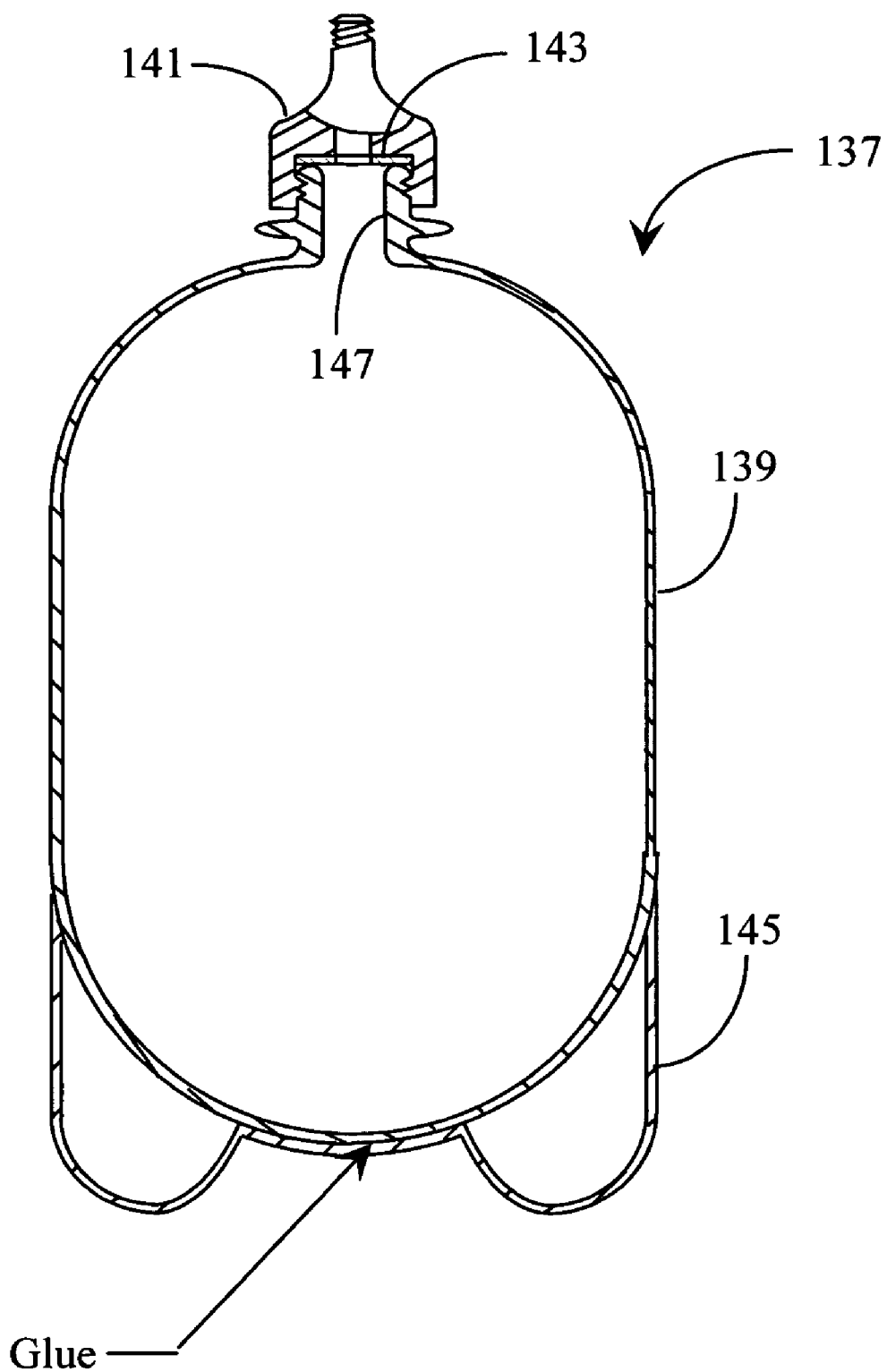
FIG. 9 is an elevation view of a special pressure-capable bottle in an embodiment of the present invention.

FIG. 9 is a cross-sectional view of a specialized pressure container 137 for preserving beverages and foodstuffs in an embodiment of the present invention. This container comprises a body 139 having substantially spherical top and bottom portions, a threaded neck portion 147 and a bottom stand 145. In this example body 139 may be blow-molded from polyethylene terephtalate (P.E.T.) material, or another suitable polymer material capable of withstanding the pressures disclosed herein in various embodiments. Bottom skirt 145 is molded from polyethylene material in this example and glued to body 139.

In this embodiment a combination cap and valve stem 141 closes neck 147 with use of a rubber-like gasket 143. Container 137 may be used in a similar manner to container 133 of FIG. 8, using an air chuck 29 (FIG. 8) to connect to the valve stem, which opens the one-way valve of the valve stem to a pressurized source of gas.

In all other respects container 137 is used in the same way for treatment and preservation of foodstuff and beverages as is container 135 of FIG. 8; and all of the descriptions above for pressurizing, depressurizing, and so forth, apply to the container of FIG. 9 as well.

Figure 10:
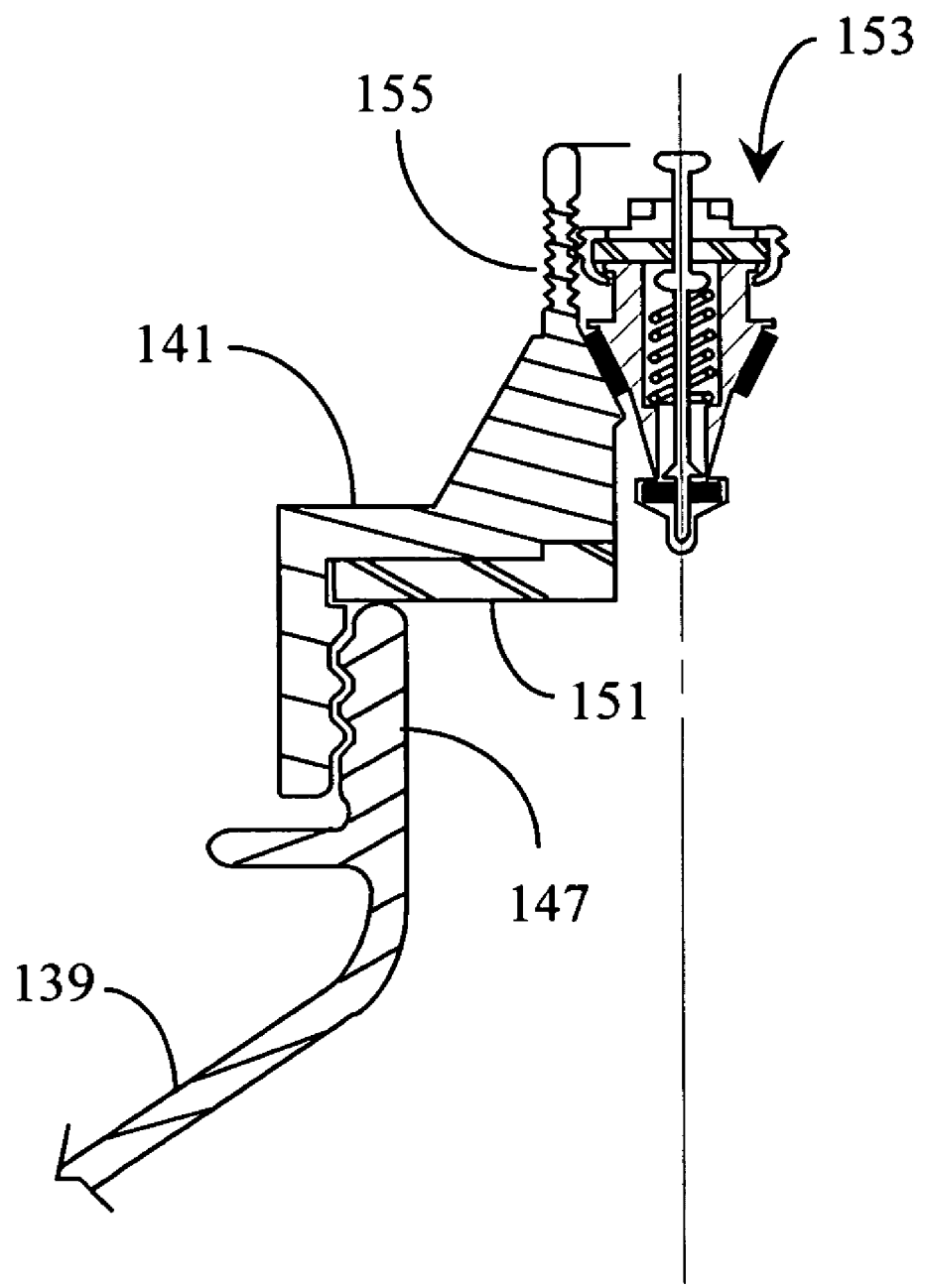
FIG. 10 is a partial section view of a cap and valve stem from FIG. 9.

FIG. 10 is an enlarged partial section view of cap 141 and included valve stem from FIG. 9. Cap 141 is a molded cap made from polycarbonate (PC) or poly oxy methylene (POM) in this example. Other polymer materials may be suitable as well. Cap 141 is treaded to engage the outer threads (male) of container 139 and to seal the container by means of a gasket 151. The internal region of the cap is threaded and shaped to accept a standard valve stem 153, of the sort used with, for example, automobile tires, which is well-known in the art. The external threads on the cap are to accept a blunt cap of the sort that are normally used on valve stems, such as on automobile tires, to seal and protect the valve stem and to serve as an extra guard against leakage.

Figure 11:
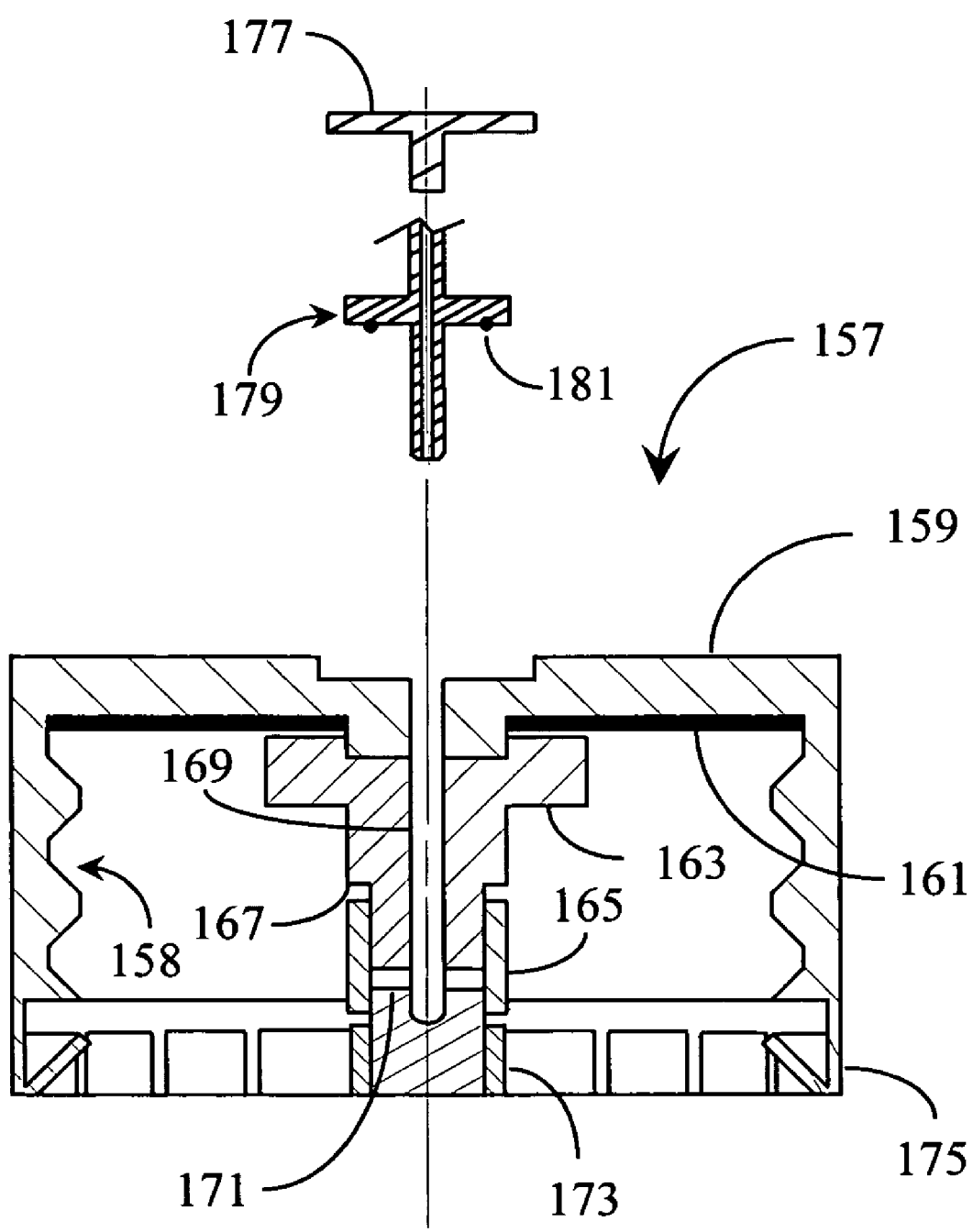
FIG. 11 is an elevation view in partial cross-section of a unique closure for a container in an embodiment of the present invention.

FIG. 11 is a cross-sectional view of an alternative cap 157 for use with a container to preserve beverages or foodstuff. In this aspect of the invention cap 157 has a body 159 with internal threads 158 to engage the male threads of a container, such as threads on threaded neck portion 147 in FIG. 10, and a ring of tabs 175 around the periphery of the cap as a tamper-proof feature, as is known in the art. A liner seal 161 serves to seal the top of the cap to the lip of the neck of the container to which it is engaged.

A valve stem 163 is joined to body 159 internally in a manner to be hermetically sealed. That is, there can be no leakage between stem 167 and cap body 159. A passage 169 extends through body 159 axially from above, and through a substantial portion of the length of the valve stem, intersecting a cross-bore 171. A rubber-like sleeve 165 engages the outer diameter of stem 163 in a manner that openings of cross-bore 171 are sealed. A stop ring 173 engaging stem 163 and a shoulder 167 on stem 163 serve to prevent ring 165 from migrating along the stem when in use, as described more fully below. Stem 163 in this embodiment is molded from a rigid plastic material.

To operate as described above with reference to FIGS. 8–10 a first gas under pressure must be introduced to a sealed container through bore 169. There is, however, no commercial valve stem as is the case with FIGS. 8–10. In this example a nozzle 179 having a lip with an o-ring 181 is used to interface to cap 157. This nozzle may be used with a hand-held trigger (air gun), or may be engaged in other ways, and is connected to a supply of pressurized gas other than oxygen, such as carbon dioxide, Nitrogen and the like.

Engaging nozzle 179 to bore 169 of cap 157, and triggering a valve causes gas to flow from the pressurized container (see FIG. 8), through bore 169 and cross-bore 171, pushing aside rubber-like sleeve 165 to flow into the preserving container. When the valve is closed at the pressure tank (or the trigger of the air gun is released) gas will not flow, and sleeve 165 will act as a one-way valve preventing gas from escaping, so desired pressure may be attained. After pressurization the gas pressure may be released simply by partial unscrewing of cap 157 from the container neck, so seal 161 disengages from the upper rim of the container.

As previously described, one or more pressure/release cycles may be used with a first gas, depending on the degree of dilution of air desired over the beverage or foodstuff. Further, the design shown for nozzle 179 is exemplary only, and this nozzle may take any one of several forms. For example, the nozzle may be a straight stem with an outer rubber covering, such that it fits relatively firmly into bore 169 and seals to the inner diameter of the bore. After the dilution process is complete, re-pressurization may be done with the same or a second gas, such as those listed above, and a resilient plug 177 may be used to seal bore 169 incap 157.

Figure 12:
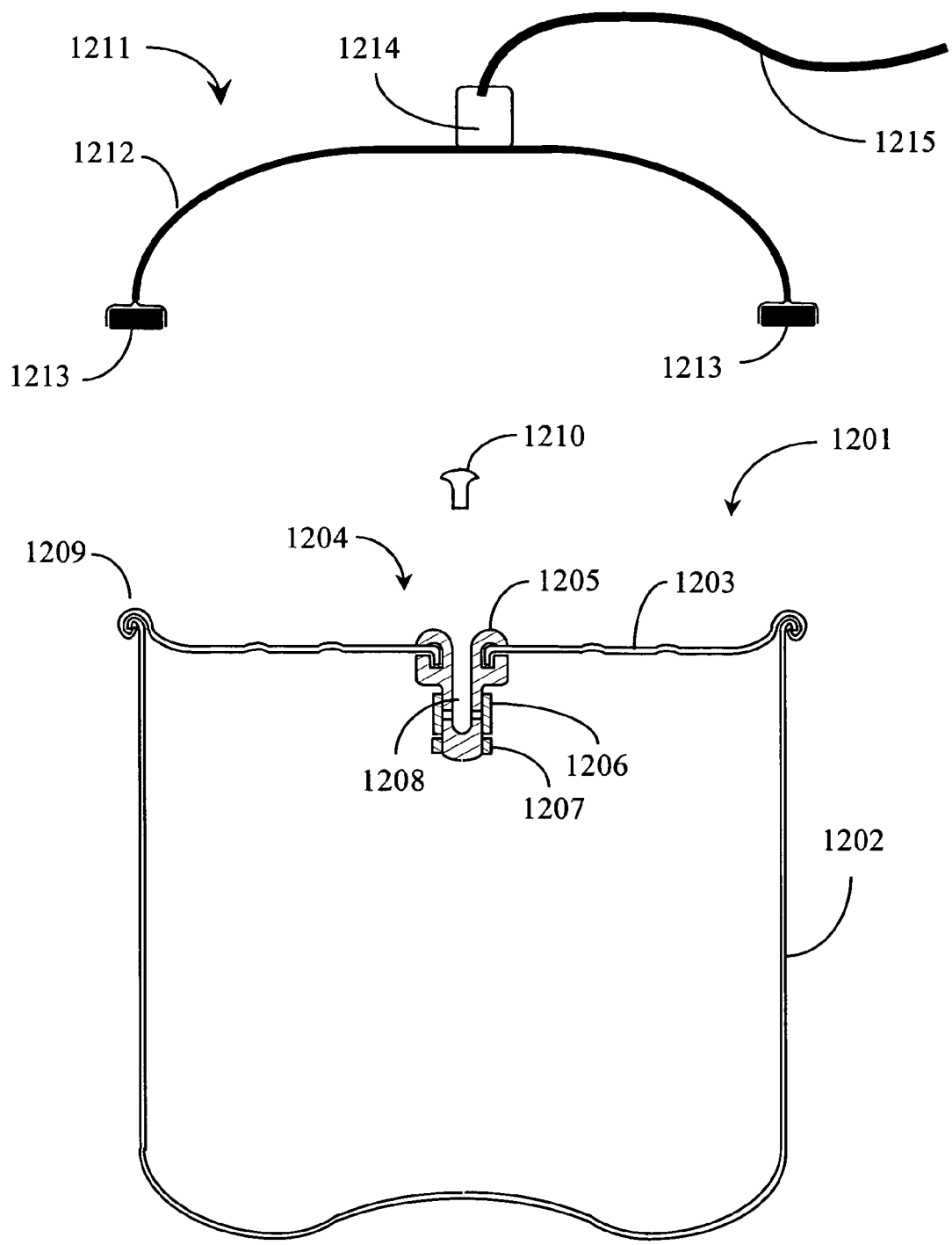
FIG. 12 illustrates an alternative storage container for beverages and foodstuff according to an embodiment of the present invention.

FIG. 12 illustrates an alternative storage container 1201 for beverages and foodstuff according to an embodiment of the present invention. Container 1201 has a deep-drawn body 1202 which may any one of several materials, such as coated ferrous material, coated aluminum or a plastic such as P.E.T. among other possibilities. In one embodiment the body is filled with the foodstuff or beverage to be stored and preserved, then a filling cap 1211 is applied. Cap 1211 comprises a dome-shaped body 1212 in this embodiment with a gasket 1213 for sealing to body 1202 of preserving container 1201 before lid 1203 is applied.

Cap 1211 has an interface 1214 through which gas may be introduced to beneath body 1212 from a source of high-pressure gas connected to conduit 1215. Once filling cap 1211 is applied to body 1202 and a seal is affected, a valve (not shown) may be opened to introduce non-oxygen gas. While gas is introduced downward pressure must be used to keep the fill cap in contact with the periphery of body 1202. The process of oxygen dilution is the same in this embodiment as previously described above. The gas pressure may vary, for example, and the number of cycles may vary as well. After each pressurization the downward pressure is relaxed, and gas escapes from beneath cap 1211 until the pressure in can 102 reduces to atmospheric pressure.

After the dilution cycles, cap 1211 is removed and lid 1203 is put in place on body 1202, and sealed. Some gas flow into filling cap 1211 may be maintained in this operation to reduce the amount of air that may enter container 1201 before the lid is sealed in place. The lid may be sealed to body 1202 by, for example, a rolled and sealed joint as shown at 1209. The rolled joint may be sealed for metal by soldering, for example, or for plastic by heat.

Lid 1203 in this embodiment comprises another version of a valve stem 1204 according to an embodiment of the invention. Stem 1204 comprises a body 1205 which is rolled and heat-sealed to lid 1203 through a central opening. A central bore 1208 extends to a cross-bore similar to other versions described above, the cross bore sealed by a flexible sleeve, which may be rubber or a suitable flexible plastic material. The stem in this case is of a rigid plastic, preferably heat-formable, and a stop ring 1207 is added after the flexible tube is added.

Stem 1204 allows for re-pressurization of container 1202 containing foodstuff after initial treatment with a first gas using filler cap 1211. The one-way valve works as already described above, and the second gas other than oxygen added may be one of, or a mixture of $CO_2$, $N_2$, $H_2$, He, Ar, $CH_4$, $C_3H_8$ or $C_4H_{10}$, as described above.

Figure 13:
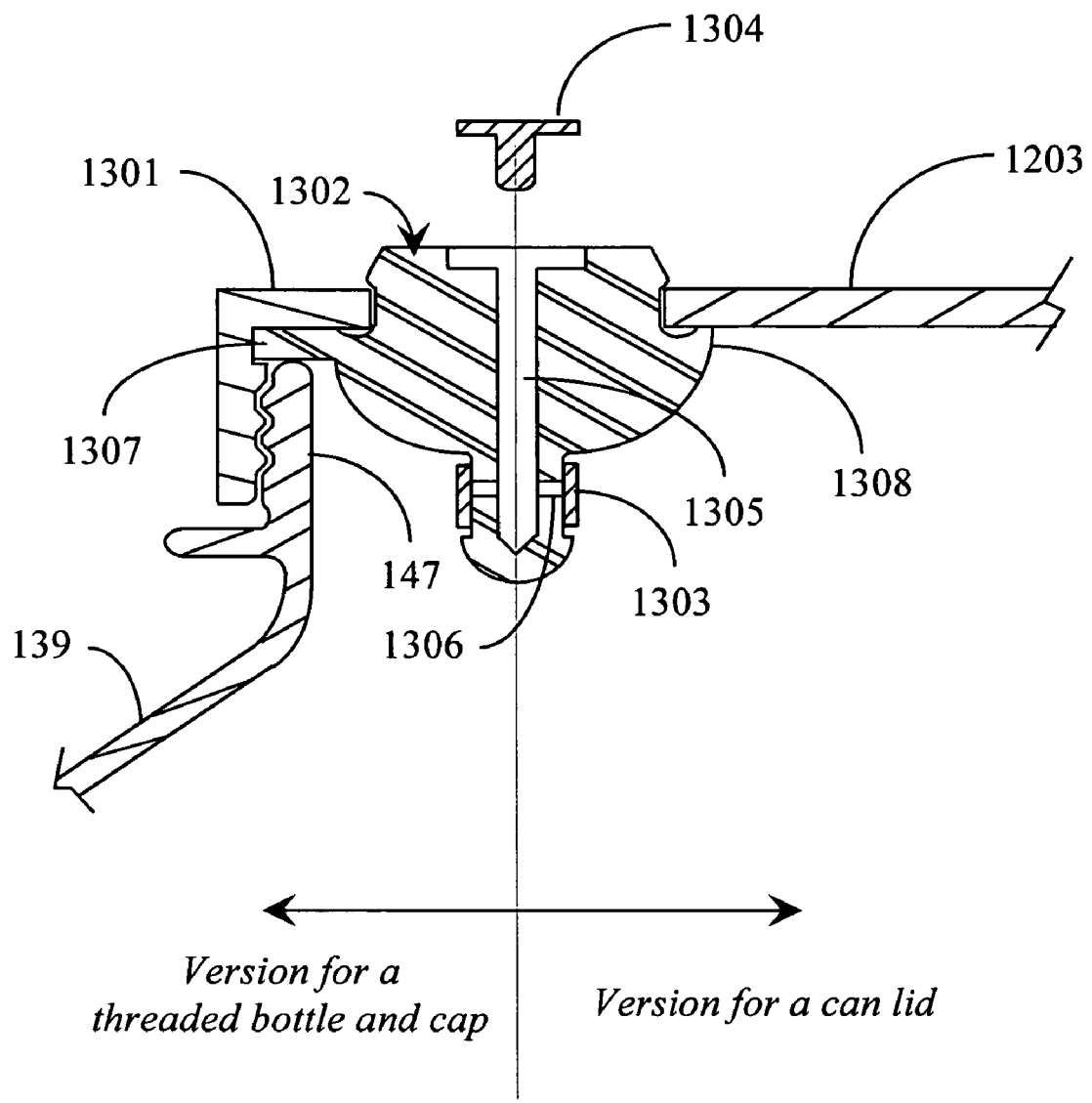
FIG. 13 is a partial section view of a rubber-like valve stem for sealing either with a bottle cap or through a hole in a can or a can lid, according to an embodiment of the invention.

In still another embodiment of the invention a valve stem of a somewhat different sort is provided, as illustrated in FIG. 13. FIG. 13 is a partial cross-section view of a valve stem 1302 made of molded rubber or rubber-like material for use with either cap for a threaded bottle, or for an opening through a can lid. A somewhat different design for this stem is shown on each side of a centerline, one for the cap and one for the lid, as indicated in the figure. Stem 1302 is made of molded natural or synthetic rubber with a central bore 1305 and a cross-bore 1306. The cross bore is covered, as in some other embodiments, by a rubber-like sleeve 1303. In one embodiment the stem has a flange portion 1307 for capturing between a lid 1301 and a threaded portion 147 of a bottle 139. In another embodiment the stem has an engagement portion 1308 for sealing to an opening in a can lid 1203. This stem has advantages in that it may be easily applied without having to perform a sealing operation such as heat sealing, for example.

Figure 14:
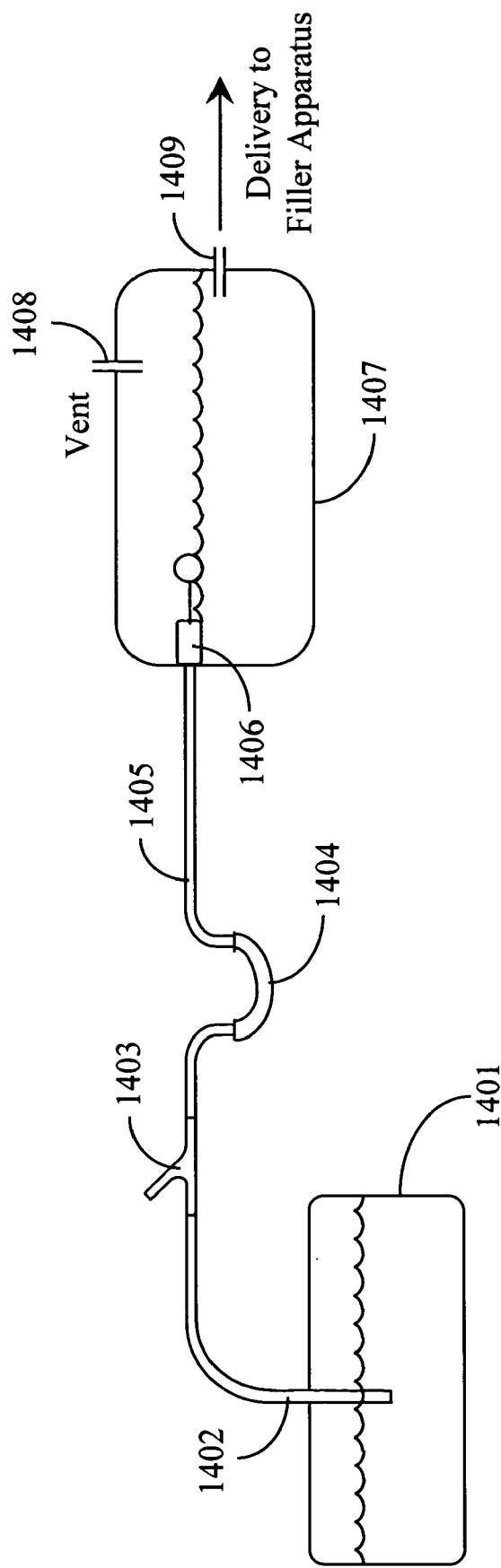
FIG. 14 is a mostly diagrammatical representation of an apparatus for de-aerating non-carbonated beverages for preservation.

In yet another aspect of the present invention an apparatus and method are provided to de-aerate non-carbonated beverages and fill sealable containers such that the beverages are substantially rid of oxygen and preserved. FIG. 14 is a mostly diagrammatical representation of an apparatus for de-aerating non-carbonated beverages. Untreated beverage in a vented tank 1401 (vent not shown) is drawn through a conduit 1402 by action of a pump 1404, thence through a second conduit 1405 into a second vented tank 1407 via a float valve 1406. A three-way valve 1403 in the path of conduit 1202 allows a gas other than oxygen, under pressure, such as Nitrogen, etc., to be entrained in the beverage. When the beverage having entrained gas reaches tank 1407 the gas releases, the pressure in tank 1407 being lower than in the conduit, such that entrained air (and its oxygen) is driven from the beverage. The beverage is thus de-aerated. Released gas and air passes from vent 1408 and another conduit 1409 conducts de-aerated beverage to a filler to be introduced to containers as described above with references to FIGS. 8–12. Once treated beverage is placed in a sealed container having a cap such as shown in FIGS. 8–12 the container may be pressurized with a non-oxygen bearing gas such as Nitrogen under pressure to further protect the beverage over time from the spoilage characteristics of Oxygen.

Vacuum/Pressurization Processing

Figure 15:
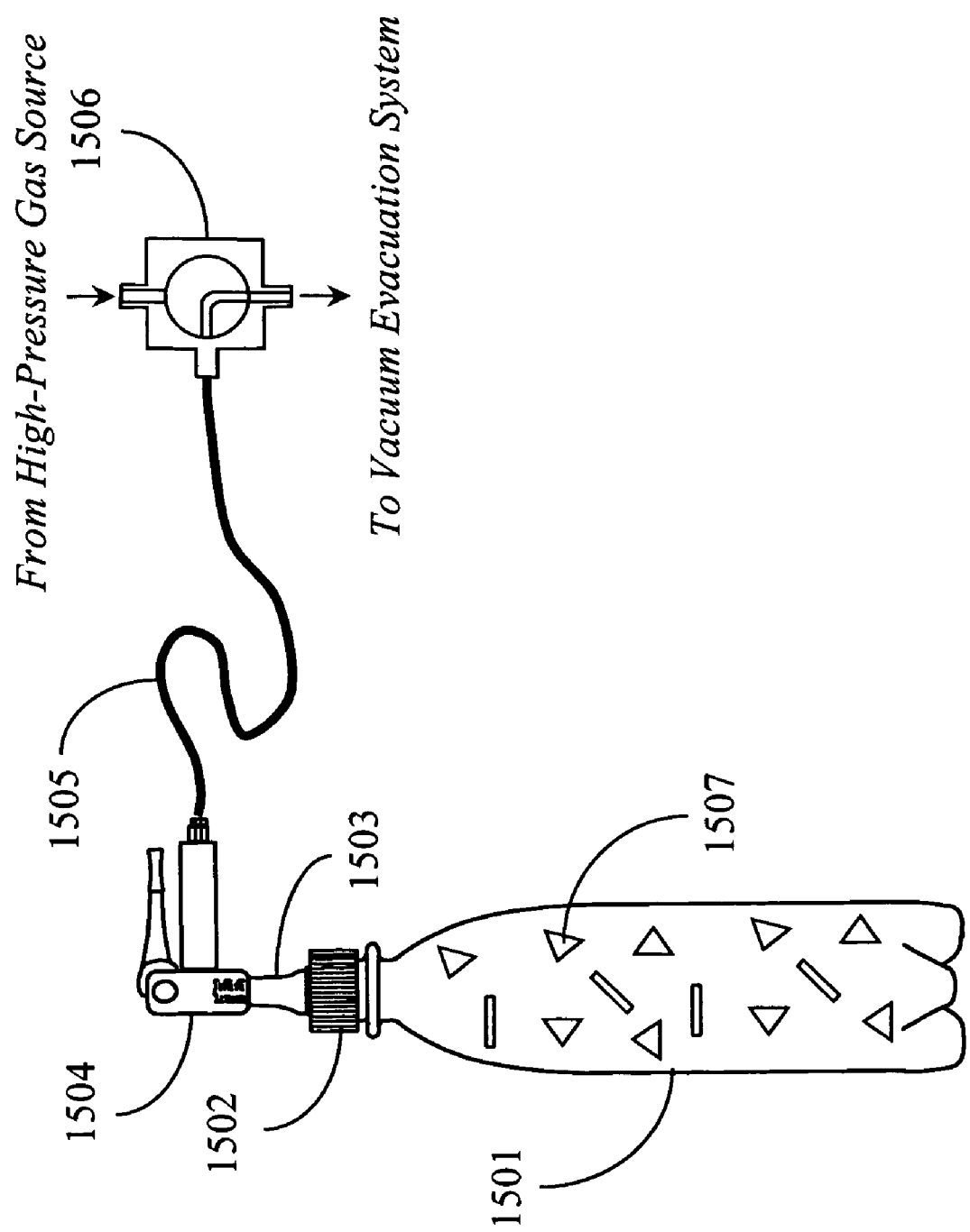
FIG. 15 is an elevation view of a system for preserving foodstuff in yet another embodiment of the invention.

In yet another aspect of the present invention vacuum is used to reduce presence of oxygen, and pressurization with one of a select group of gases is used to provide further spoilage protection for foods and beverages. FIG. 15 illustrates a food container 1501 in which solid foodstuff represented by shapes 1507 have been enclosed. Container 1501 has a cap 1502 through which a one-way valve 1503, such as a tire stem valve has been mounted hermetically. A conventional air chuck 1504 is engaged to the tire stem valve as previously shown and described with reference to FIGS. 1 and 2, and a conduit 1505 leads to one orifice of a three-way valve, as also previously illustrated and described.

In this embodiment, differing from the previous embodiments, one of the two remaining orifices of the three way valve is connected to a vacuum apparatus, and the remaining orifice is connected to a source of high-pressure gas. Three way valve 1506 is shown in a position to connect the vacuum source to the inside of container 1501.

It is known to the inventor that some forms of foodstuffs, such as dried foods and dry, crispy snacks, such as potato chips, are treated by vacuum first and then by filling the container with one atmosphere of nitrogen. The inventor is also aware that these sorts of foods are typically sold in a plastic bag, not capable of sustaining significant internal pressure, and are not substantially sensitive to bacteria spoilage. The present invention in this aspect, and in various embodiments is meant to provide protection from spoilage for foodstuff that is sensitive to spoilage from bacterial action, and without refrigeration.

In use of the apparatus shown in FIG. 15, one proceeds generally by the following steps:

Step 1: Place food 1507 into bottle or can 1501. Note: bottle 1501 is representative of a variety of containers that might be used, with the requirement that the container be capable of safely maintaining an internal pressure of from about ten psig (pounds per square inch gauge) To 100 psig.

Step 2: Place cap 1502 on the bottle or a lid with a stem valve on the can.

Step 3: Attach air chuck 1504 to valve stem 1503, opening the one-way valve in the stem, and connecting the bottle/can to three-way valve 1506 (which should be in this point in a position to block communication between valve orifices).

Step 4: Move control on three-way valve 1506 to connect the bottle/can to the orifice marked "Vacuum Evacuation System". This system can be one of several different types to pump air out of the bottle/can and reduce the pressure to one-tenth atmosphere or less.

Step 5: Move the control on three-way valve 1506 to connect the bottle/can to the orifice labeled "From High-Pressure Gas Source". Gas now backfills the bottle/can and pressurizes it to from 10 to 100 psig. As indicated above.

Step 6: Move control of three-way valve 1506 again to the neutral position where no orifices are connected, and disconnect air chuck 1504 from stem valve 1503, which closes the stem valve. Now the foodstuff in the bottle or can is pressurized with gas after having the oxygen content reduced significantly.

As has been described above in other embodiments of this invention the first gas may be one of, or a mixture of carbon dioxide and nitrogen, and the second gas may be one of, or a mixture of, carbon dioxide, nitrogen, hydrogen, helium, argon, methane, propane or butane.

Figure 16:
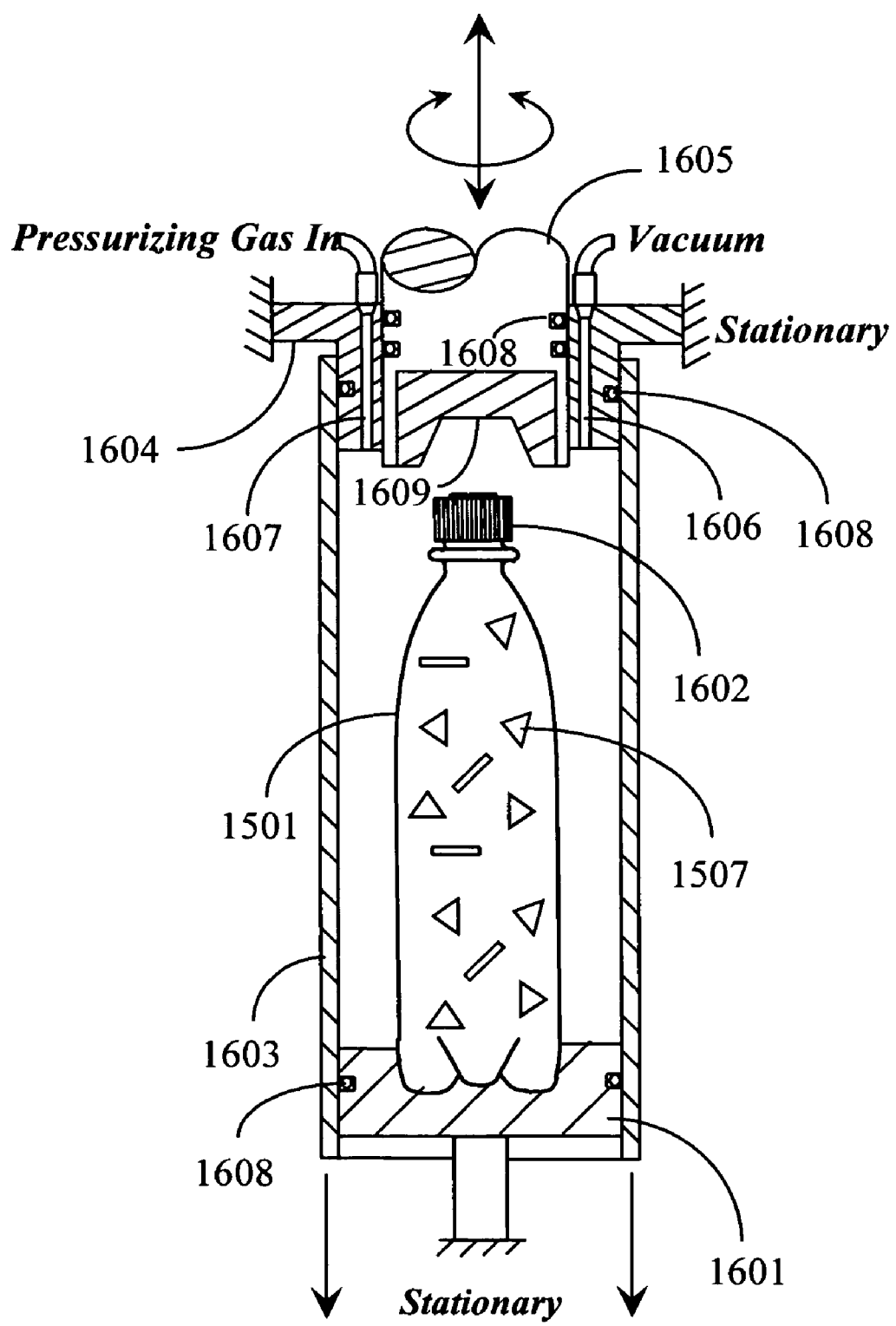
FIG. 16 is a partial cross-section elevation view of an automated apparatus for preserving foodstuff in another embodiment of the invention.

FIG. 16 is a partial cross section view in elevation of an apparatus accomplishing objects of the invention in yet another aspect of the invention. The Apparatus shown in FIG. 16 is for automating the process of filling, vacuum processing, and pressurizing described above with reference to FIG. 15. A stationary framework including at least a pedestal 1601 and an upper portion 1604 has a translatable tube 1603 that engages both portions 1601 and 1604 to provide a closed container with the tube in an upper position. Seals are shown in this apparatus by o-rings 1608 in appropriate grooves; but might be done in other conventional ways. In some embodiments the translatable tube is raised and lowered by mechanical mechanism, in others by pneumatic actuator, and may be done in other ways as well.

Upper stationary portion 1604 has two passages therethrough, one passage 1606 leading to a valved vacuum pumping apparatus, and the other passage 1607 leading to a valved source of high-pressure gas. A capping apparatus 1605 is implemented as a cylinder sealed with o-rings 1608 that can be translated vertically to engage a capping or closure mechanism 1609 with cap 1602. This closer mechanism may be in some embodiments a crimper for crimping bottle caps to seal, or a gripper for engaging and turning a threaded cap to seal. In other embodiments the closure mechanism might be implemented to crimp a metal lid on a can.

The apparatus of FIG. 16 is used in generally the following manner:

Step 1: Firstly, with tube 1603 fully withdrawn, providing clear access to pedestal 1601, one places a container 1501 on pedestal 1601. The container may be a bottle with a crimping lid, a bottle with a screw-on lid or a can with an appropriate closure. The apparatus is implemented to accommodate the appropriate container and closure.

Step 2: The container is filled with foodstuff to be preserved, and the closure is loosely applied. The container may already be filled and the cap loosely applied before the container is placed on the stand.

Step 3: Now tube 1603 advances upward to engage and seal to upper stationary portion 1604, forming a generally air-tight compartment around container 1501.

Step 4: A valve (not shown) is opened connecting the remote vacuum source to the closed compartment of tube 1603 through passage 1606, and the compartment is effectively evacuated. Because cap 1602 is loosely applied (not sealed) the inside of container 1501 is also effectively evacuated.

Step 5: The valve for the vacuum source is closed and a valve (not shown) is opened connecting a remote source of gas under pressure to the compartment around container 1501. The compartment is pressurized with the gas, and because cap 1602 is loosely applied, container 1501 is also pressurized.

Step 6: Capping apparatus 1605 is activated and translated to engage cap 1602 and seal the cap to the container. As briefly described above this may be a crimping apparatus, a turning device for a threaded cap, or another kind of apparatus altogether, depending on need.

Step 7: Now the foodstuff in container 1501 is pressurized with a gas after evacuation to reduce the amount of oxygen in the container. The compartment may now be vented and opened (venting not shown but will be clearly evident to the skilled artisan), and the container of processed foodstuff may be removed.

As has been described above in other embodiments of this invention the first gas may be one of; or a mixture of carbon dioxide and nitrogen, and the second gas may be one of, or a mixture of, carbon dioxide, nitrogen, hydrogen, helium, argon, methane, propane or butane.

It will be apparent to the skilled artisan that different details of the invention as described for vacuum processing may be implemented in a variety of ways within the spirit and scope of the invention.

For example, there are a wide variety of sealed containers that might be used. Only one has been shown. For higher pressure uses one may provide gas bottles with rounded shaped that are very sturdy. Further, it is not required in all cases that the mouth of the container be quite large. This is necessary only for the processing foodstuff. A container for processing a beverage might have a relatively small mouth for introducing the liquid into the container.

For these and other reasons, the present invention should be afforded the broadest possible scope under examination. The spirit and scope of the invention is limited only by the claims that follow.

What is claimed is:

1. A system for preserving a perishable material sensitive to oxygen, comprising:

a pressurized source of a first gas other than oxygen;

a container for the perishable material, the container having a sealable lid, a passage including a one-way valve through the lid connected by a gas conduit to the pressurized source, and a mechanism for venting the container; and a simple shut-off valve in the gas conduit;

wherein oxygen exposure to the perishable material in the container is diluted by at least one cycle of pressurizing the container with the first gas other than oxygen, and then venting the container and wherein the one-way valve system comprises a stem having an axis and an axial bore through the lid and a cross-bore from the axial bore, the cross-bore exiting the stem at a right angle to the axial bore, the cross-bore covered by a flexible sleeve over the outside diameter of the stem, such that gas introduced through the axial bore flexes the sleeve to enter the container, but gas within the container is prevented by the sleeve from exiting the container.

2. The system of claim 1 wherein the one way valve comprises a tire valve stem, and further comprising an air-chuck engaging the tire valve stem holding the one-way valve open.

3. The system of claim 2 further comprising a user-operable three-way valve system in the conduit between the air chuck and the pressurized source of first gas, the three-way valve system having a first, a second, and a third orifice providing a first, a second and a third valve state, which in the first state connects the first orifice with the second orifice, in the second state connects the second orifice with the third orifice, and in the third state closes internal passage between all orifices, the valve system connected from the first orifice to the pressurized source of gas other than oxygen and from the second orifice to the gas conduit to the air chuck, with the third orifice open to atmosphere, such that the container may be pressurized, vented and isolated by selecting individual ones of the three positions of the three-way valve.

4. The system of claim 1 further comprising a releasable adapter having an extension for engaging the axial bore.

5. The system of claim 1 wherein the sealable lid engages the container by a threaded interface, and venting is accomplished by loosening the lid at the threaded interface.

6. The system of claim 1 wherein the container comprises a body having substantially spherical top and bottom portions, a threaded neck portion, and a bottom stand.

7. The system of claim 6 wherein the container except for the bottom stand is blow-molded from a plastic material.

8. The system of claim 7 wherein the plastic material is polyethylene terephtalate (P.E.T.) material.

9. The system of claim 6 wherein the bottom stand is molded from a plastic material and joined to the body by an adhesive.

10. The system of claim 1 wherein, alter the one or more dilution cycles the container is pressurized with a second gas other than oxygen, and the conduit is disengaged, leaving the container pressurized with the second gas.

11. The system of claim 1 wherein the first gas is one of, or a mixture of carbon dioxide and nitrogen.

12. The system of claim 10 wherein the second gas is one of, or a mixture of, carbon dioxide, nitrogen, hydrogen, helium, argon, methane, propane or butane.

13. A system for preserving a perishable material sensitive to oxygen, comprising:
a pressurized source of a first gas other than oxygen;
a container for the perishable material, a separate lid sealable at an upper periphery to the container, and a passage including a one-way valve through the lid; and
a pressurizing cover separate from the lid comprising a gasket for sealing to the container at the upper periphery, the pressurizing cover connected by a conduit to the source of pressurized gas other than oxygen;
wherein oxygen exposure to the perishable material in the container is diluted by at least one cycle of engaging the pressurizing cover via the gasket to the upper periphery of the container, and alternately removing the pressurizing cover from the container, allowing the container to vent to atmosphere.

14. The system of claim 13 wherein, after one or more dilution cycles the sealable lid is sealed to the container.

15. The system of claim 14 wherein, after the sealable lid is sealed to the container, the container is again pressurized through the one-way valve with the first gas other than oxygen.

16. The system of claim 15 wherein, after one or more dilution cycles, the sealed lid is sealed to the container, and the container is again pressurized, by a second gas other than oxygen.

17. The system of claim 15 wherein the first gas other tan oxygen is one of, or a mixture of carbon dioxide and nitrogen.

18. The system of claim 16 wherein the second gas other than oxygen is one of, or a mixture of, carbon dioxide, nitrogen, hydrogen, helium, argon, methane, propane or butane.

19. The system of claim 14 wherein the one-way valve through the separate lid comprises a stem having an axis and a coaxial internal passage through the lid, the internal passage exiting the stem at a right angle to the coaxial passage and covered by a flexible sleeve over the outside diameter of the stem, such that gas introduced through the coaxial passage flexes the sleeve to enter the container, but gas within the container is prevented by the sleeve from exiting the container.

20. The system of claim 14 wherein the container and separate lid are metal, and wherein the seal between the container and lid is a rolled and soldered seal.

21. The system of claim 14 wherein the container and separate lid are plastic, and wherein the seal between the container and lid is made by a heat sealing process.

22. The system of claim 19 wherein the one-way valve is molded of a rubber-like material, and further comprises an engageable/disengageable seal for mounting the one way valve to a hole through the lid.

23. A method for preserving a perishable material sensitive to oxygen, comprising:
(a) placing the perishable material in a container having a sealable lid and a passage including a one-way valve through the lid connected by a gas conduit, including a simple shut-off valve, to a pressurized source of a first gas other than oxygen;
(b) closing the lid;
(c) reducing oxygen in the container by pressurizing the container holding the perishable material with the first gas other than oxygen utilizing the one-way valve also comprising a stem having an axis and a coaxial internal passage through the lid, the internal passage exiting the stem at a right angle to the coaxial passage and covered by a flexible sleeve over the outside diameter of the stem, such that gas introduced through the coaxial passage flexes the sleeve to enter the container, but gas within the container is prevented by the sleeve from exiting the container; and
(d) venting the container.

24. The method of claim 23 wherein steps (c) and (d) are repeated to further reduce oxygen in the container.

25. The method of claim 23 wherein the one way valve comprises a tire valve stem, and further comprising an air-chuck engaging the tire valve stem holding the one-way valve open.

26. The method of claim 25 further comprising a user-operable three-way valve system in the conduit between the air chuck and the pressurized source of first gas, the three-way valve system having a first, a second, and a third orifice providing a first, a second and a third valve state, which in the first state connects the first orifice with the second orifice, in the second state connects the second orifice with the third orifice, and in the third state closes internal passage between all orifices, the valve system connected from the first orifice to the pressurized source of gas other than oxygen and from the second orifice to the gas conduit to the air chuck, with the third orifice open to atmosphere, such that the container may be pressurized, vented and isolated by selecting individual ones of the three positions of the three-way valve.

27. The method of claim 23 further comprising a releasable adapter having an extension for engaging the coaxial internal passage.

28. The method of claim 23 wherein the sealable lid engages the container by a threaded interface, and venting is accomplished by loosening the lid at the threaded interface.

29. The method of claim 23 wherein the container comprises a body having substantially spherical top and bottom portions, a threaded neck portion, and a bottom stand.

30. The method of claim 29 wherein the container except for the bottom stand is blow-molded from a plastic material.

31. The method of claim 30 wherein the plastic material is polyethylene terephtalate (P.E.T.) material.

32. The method of claim 31 wherein the bottom stand is molded from a plastic material and joined to the body by an adhesive.

33. The method of claim 23 wherein, after the one or more dilution cycles the container is pressurized with a second gas other than oxygen, and the conduit is disengaged, leaving the container pressurized with the second gas.

34. The method of claim 33 wherein the first gas is one of, or a mixture of carbon dioxide or nitrogen.

35. The method of claim 34 wherein the second gas is one of, or a mixture of carbon dioxide, nitrogen, hydrogen, helium, argon, methane, propane or butane.

36. A method for preserving a perishable material sensitive to oxygen, comprising:
 (a) placing the perishable material in a container having an upper periphery;
 (b) engaging a pressurizing cover to the container via a gasket engaging the upper periphery, the cover connected by a conduit to a pressurized source of a first gas other than oxygen;
 (c) venting the container by lifting the pressurizing cover, thereby reducing the oxygen in the container by dilution; and
 (d) sealing a separate lid to the container to prevent air from entering the container.

37. The method of claim 36 wherein steps (b) and (c) are repeated to further reduce oxygen in the container.

38. The method of claim 36 further comprising a one-way valve through the separate lid, wherein, after the separate lid is sealed to the container, the container is again pressurized through the one-way valve with the first gas other than oxygen.

39. The method of claim 36 further comprising a one-way valve through the separate lid, and wherein, after the separate lid is sealed to the container, the container is again pressurized, by a second gas other than oxygen.

40. The method of claim 36 wherein the first gas other than oxygen is one of, or a mixture of carbon dioxide and nitrogen.

41. The method of claim 39 wherein the second gas other than oxygen is one of, or a mixture of carbon dioxide, nitrogen, hydrogen, helium, argon, methane, propane or butane.

42. The method of claim 38 wherein the one-way valve through the separate lid comprises a stem having an axis and a coaxial internal passage through the lid, the internal passage exiting the stem at a right angle to the coaxial passage and covered by a flexible sleeve over the outside diameter of the stem, such that gas introduced through the coaxial passage flexes the sleeve to enter the container, but gas within the container is prevented by the sleeve from exiting the container.

43. The method of claim 36 wherein the container and separate lid are metal, and wherein the seal between the container and lid is a rolled and soldered seal.

44. The method of claim 36 wherein the container and separate lid are plastic, and wherein the seal between the container and lid is made by a heat sealing process.

45. The system of claim 38 wherein the one-way valve is molded of a rubber-like material, and further comprises an engageable/disengageable seal for mounting the one way valve to a hole through the separate lid.

46. A system for treating to preserve a liquid perishable by exposure to oxygen, comprising:
 a first container for holding the liquid to be preserved;
 a second container for holding treated liquid;
 a conduit between the first and the second containers; and
 an injection nozzle in the conduit between the containers and before a pump;
 wherein a gas other than oxygen is injected into the liquid as the liquid passes through the conduit, the gas mixing with the liquid and separating from the liquid in the second container, thereby reducing the level of concentration of oxygen in the treated liquid as compared to the untreated liquid.

47. The system of claim 46 wherein the second container is a closed container having a vent fir venting gas from the second container.

48. The system of claim 46 wherein the second container comprises a connection to a filler apparatus for filling sealable containers with the treated liquid.

49. A method for treating a liquid perishable by exposure to oxygen to preserve the liquid, the method comprising the steps of:
 (a) placing untreated liquid in a first container;
 (b) pumping the untreated liquid by a pump from the first container to a second container through a conduit; and
 (c) injecting a gas other than oxygen into the liquid passing through the conduit at an injection nozzle ahead of the pump, such that the gas entrains with the liquid, and separates from the liquid in the second container, reducing the level of concentration of oxygen in the treated liquid as compared to the untreated liquid.

50. The method of claim 49 wherein the second container is a closed container having a vent, and gas separating from the treated liquid in the second container is vented.

51. The method of claim 49 wherein the second container comprises a connection to a filler apparatus for filling sealable containers with the treated liquid, and treated liquid is provided to sealable containers through the connection.

52. A one-way valve stem for a sealable container comprising:
 a body having a central bore with an axial opening and a cross bore through the central bore providing at least one cross-bore opening from the central bore at about a right angle to the central bore; and
 a flexible sleeve covering the at least one opening of the cross bore;
 such that gas under pressure introduced into the central bore may flex the flexible sleeve and escape through the cross-bore opening, but gas may not travel from the outside of the sleeve into the cross-bore opening and into the central bore.

53. The one-way valve of claim 52 further comprising a physical interface between the axial opening and the cross-bore opening, the physical interface for sealing through a wall of a container or a lid for a container, such that when mounted through the wall or lid the axial opening is outside the container and the cross-bore opening covered by the flexible sleeve is inside the container.

54. The one-way valve stem of claim 52 wherein the body is rigid plastic.

55. The one-way valve of claim 52 wherein the body is molded of a rubber-like material.

56. The one-way valve of claim 52 wherein the physical interface comprises a flange for sealing between a bottle neck rim and the underside of a cap.

57. The one way valve of claim 52 wherein the physical interface includes a rim for sealing to a round hole through a can lid.

58. A system for preserving a perishable material sensitive to bacterial spoilage, comprising:
   a vacuum apparatus;
   a source of a pressurized gas;
   a pressurized source of a gas other than oxygen;
   a container for the perishable material, the container having a sealable lid;
   and a user-operable three-way valve system in a conduit leading from the container, the three-way valve system having a first, a second, and a third orifice providing a first, a second and a third valve state, which in a first state connects the container with the vacuum apparatus, in a second state connects the container with the pressurized source of gas and in a third state closes internal passages between all orifices;
   wherein oxygen in the container is reduced by applying the vacuum apparatus to pump air out of the container, and the container is then pressurized by the pressurized source of gas other than oxygen, after which the container is sealed.

59. The system of claim 11 wherein the pressurized gas is one of, or a mixture of, carbon dioxide, nitrogen, hydrogen, helium, argon, methane, propane or butane.

60. The system of claim 58 wherein preserving the perishable material is automated by an apparatus with a pedestal for a food container, a translatable tubing providing a sealed compartment around the food container, a vacuum apparatus connectable to the compartment, a source of pressurized gas connectable to the compartment, and a mechanism for closing and sealing the container in the compartment.

* * * * *